(12) United States Patent
Bodin et al.

(10) Patent No.: US 7,519,904 B2
(45) Date of Patent: *Apr. 14, 2009

(54) DIFFERENTIAL DYNAMIC DELIVERY OF CONTENT TO USERS NOT IN ATTENDANCE AT A PRESENTATION

(75) Inventors: William Kress Bodin, Austin, TX (US); Michael John Burkhart, Round Rock, TX (US); Daniel G. Eisenhauer, Austin, TX (US); Daniel Mark Schumacher, Pflugerville, TX (US); Thomas J. Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

This patent is subject to a terminal disclaimer.

(21) Appl. No.: 10/887,429

(22) Filed: Jul. 8, 2004

(65) Prior Publication Data

US 2006/0010228 A1 Jan. 12, 2006

(51) Int. Cl.
*G06F 17/00* (2006.01)
(52) U.S. Cl. .................. 715/234; 715/200; 715/255
(58) Field of Classification Search ......... 715/200–202, 715/234, 255, 237, 753
See application file for complete search history.

(56) References Cited

U.S. PATENT DOCUMENTS

| 3,644,674 | A | 2/1972 | Mitchell et al. |
| 4,941,187 | A | 7/1990 | Slater |
| 5,327,176 | A | 7/1994 | Forler et al. |
| 5,428,400 | A | 6/1995 | Landis et al. |
| 5,724,416 | A | 3/1998 | Foladare et al. |
| 5,748,725 | A | 5/1998 | Kubo |
| 5,881,373 | A | 3/1999 | Elofsson et al. |
| 5,901,230 | A | 5/1999 | Walker |
| 6,138,040 | A | 10/2000 | Nicholls et al. |
| 6,212,275 | B1 | 4/2001 | Akhteruzzaman |

(Continued)

FOREIGN PATENT DOCUMENTS

WO    WO 01/24462 A1    4/2001

OTHER PUBLICATIONS

U.S. Appl. No. 10/285,615, filed Oct. 31, 2002, Bates.

(Continued)

*Primary Examiner*—Thu Huynh
(74) *Attorney, Agent, or Firm*—John Biggers; Jill Poimboeuf; Biggers & Ohanian LLP.

(57) ABSTRACT

Differential dynamic content delivery including providing a session document for a presentation including a session grammar and a session structured document, the session structured document including a classified structural element for a first user who will not attend a presentation and a classified structural element for a second user who will attend the presentation; receiving, during the presentation, presentation control instructions controlling the presentation; selecting during the presentation classified structural elements for the second user in dependence upon the presentation control instructions and user classifications of the second user; presenting to the second user during the presentation the selected classified structural elements for the second user; selecting, after the presentation, classified structural elements for the first user in dependence upon the recorded presentation control instructions and the user classifications of the first user; and presenting after the presentation the classified structural elements selected for the first user.

1 Claim, 21 Drawing Sheets

U.S. PATENT DOCUMENTS

| | | |
|---|---|---|
| 6,243,454 B1 | 6/2001 | Eslambolchi |
| 6,314,402 B1 | 11/2001 | Monaco et al. |
| 6,324,499 B1 | 11/2001 | Lewis et al. |
| 6,349,136 B1 | 2/2002 | Light et al. |
| 6,366,578 B1 | 4/2002 | Johnson |
| 6,493,671 B1 | 12/2002 | Ladd et al. |
| 2002/0035976 A1 | 3/2002 | Nakamura et al. |
| 2002/0087416 A1 | 7/2002 | Knutson |
| 2002/0087974 A1 | 7/2002 | Sprague |
| 2002/0095454 A1 | 7/2002 | Reed et al. |
| 2002/0129354 A1 | 9/2002 | Bryan et al. |
| 2002/0133500 A1 | 9/2002 | Arlein et al. |
| 2002/0147782 A1 | 10/2002 | Dimitrova et al. |
| 2003/0028871 A1 | 2/2003 | Wang et al. |
| 2003/0037301 A1 | 2/2003 | Rising, III |
| 2003/0099343 A1 | 5/2003 | Dezonno |
| 2003/0158969 A1 | 8/2003 | Gimson et al. |
| 2005/0154595 A1* | 7/2005 | Bodin et al. ............... 704/277 |
| 2006/0010198 A1* | 1/2006 | Bodin et al. ............... 709/204 |
| 2006/0020445 A1* | 1/2006 | Bodin et al. ............... 704/9 |
| 2006/0218475 A1* | 9/2006 | Bodin et al. ............... 715/500 |

OTHER PUBLICATIONS

Engelbart; Authorship Provision in Augment; IEEE Cat. No. 84CH2017-2; Spring 1984; p. 465-472; IEEE Comput. Soc. Press, Silver Spring, MD; USA.

Websgebg et al; Real-time Content-Based Processing of Multicast Video; Cat. No. 98CH36284; 1998; pp. 882-886, vol. 1; IEEE, Piscataway, NJ, USA; USA.

Kim et al; An Extended Object Composition Model for Distributed Multimedia Services; Cat. No. 98CH36284; Jan. 2002; pp. 279-286, vol. 1; IEEE, Piscataway, NJ, USA; USA.

Agawa et al.; Image Analysis for Face Modeling and Facial Image Reconstruction; SPIE; 1990; pp. 1184-1197; vol. 1360, pt 2; US.

Kim et al.; An Extended Object Composition Model for Distributed Multimedia Supports in World-Wide Web; INSPEC AN B9810-6210R-071, C9810-6130M-080; 1997; pp. 159-74; Singapore.

* cited by examiner

Presentation document ~ 314

Presentation grammar (object) ~ 120
Structured document (object) ~ 122
Original document location (URI) ~ 202

User profile ~ 126

User name (string) ~ 204
Password (string) ~ 206
User grammar (object) ~ 208
User classifications (string array) ~ 210

Presentation session ~ 128

Presentation ID (string) ~ 212
Presenter ID (string) ~ 214
Participant list ID (string array) ~ 216
Schedule (date and time) ~ 218
Requested content (URI array) ~ 220
Filtered content (URI array) ~ 222
mergeGrammars (method) ~ 224

Agent ~ 110

Content type plug-ins (object array) ~ 114
Classification plug-ins (object array) ~ 116
createStructuredDocument (method) ~ 230

Content type plug-in ~ 114 createPresentationGrammar (method) ~ 232

Classification plug-in ~ 116 classifyDocument (method) ~ 234

FIG. 2

| Full Grammar 308 ||||||
|---|---|---|---|---|---|
| Content Type 410 | Key Phrase 516 | Presentation Action Identifier 518 | Structural Element Identifier 318 | Parameter 520 ||
| WP | page down | PgDn |  | null | 502 |
| WP | page up | PgUp |  | null | 504 |
| WP | go to page | goToPage |  | integer | 506 |
| WP | next paragraph | nextParagraph | <paragraph> | null | 508 |
| WP | go to heading | nextHeading | <heading> | string | 510 |
| WP | previous bullet | prevBullet | <bullet> | null | 512 |
| WP | go to subtitle | goToSubtitle | <subtitle> | string | 514 |

FIG. 5

DIFFERENTIAL DYNAMIC DELIVERY OF CONTENT TO USERS NOT IN ATTENDANCE AT A PRESENTATION

BACKGROUND OF THE INVENTION

1. Field of the Invention

The field of the invention is data processing, or, more specifically, methods, systems, and products for differential dynamic content delivery.

2. Description of Related Art

Multimedia presentations through conferencing systems are becoming more common, but they are inflexible because all conference participants must be presented with exactly the same content. For any particular presentation, however, there is typically a wide variety of participant interest, company, group, or department membership, technical knowledge, security authorization, and so on, across almost any dimension in which participants may vary. Targeting content for such a heterogeneous set of users is typically a manual process today in which presenters create wholly separate presentations for each audience, and the content of each such presentation is reduced to the lowest common denominator of any particular audience. There is a substantial need for improved multimedia presentation systems.

SUMMARY OF THE INVENTION

Methods, systems, and products are disclosed that operate generally to support improved multimedia presentations by creating a presentation document that includes a content-specific presentation grammar and a structured document. The structured document typically has structural elements such as pages, paragraphs, cells, titles, and the like marked with structural identifiers. A content-specific presentation grammar ties presentation actions to the document structure through these structural element identifiers. A presentation actions directs the presentation of a document such as by moving the presentation to the next page of the document, the previous paragraph of the document and so on. A presentation grammar empowers a presenter to invoke the presentation actions using speech.

In typical embodiments, users are assigned classifications describing any attributes of a user, company name, department name, age, gender, technical knowledge, educational level, subject matters of personal interest, security authorization, and so on. Contents of structural elements from structured documents are then filtered for presentation to individual users in a multi-media, multi-user presentation according to the individual attributes of the participants.

In a presentation regarding marketing of a deep space vehicle for a Mars mission, for example, graphic images and paragraphs of text may be developed in many versions, inserted into the same presentation document with each version classified according to technical level, security level, and so on, so that a member of the marketing department viewing the same paragraph at the same time in the same presentation as a member of the research department will in fact be shown a different version of the paragraph. A graphic diagram of a subsystem presented to the marketer will be a simpler version than the one shown at the same time to the researcher.

More particularly, methods, systems, and computer program products are disclosed for differential dynamic content delivery. Typical embodiments include providing a session document for a presentation including a session grammar and a session structured document, the session structured document including a classified structural element for a first user who will not attend a presentation and a classified structural element for a second user who will attend the presentation; receiving, during the presentation, presentation control instructions controlling the presentation; selecting during the presentation classified structural elements for the second user in dependence upon the presentation control instructions and user classifications of the second user; presenting to the second user during the presentation the selected classified structural elements for the second user; selecting, after the presentation, classified structural elements for the first user in dependence upon the recorded presentation control instructions and the user classifications of the first user; and presenting after the presentation the classified structural elements selected for the first user.

Typical embodiments also include recording, during the presentation, presentation control instructions controlling the presentation. In many embodiments, each recorded presentation control instruction has an associated time stamp. Typical embodiments also include creating each presentation control instruction, carried out by receiving from a user participating in the presentation a key phrase and optional parameters for invoking a presentation action; and parsing the key phrase and parameters against a voice response grammar into a presentation control instruction.

In many embodiments, each presentation control instruction includes a presentation action identifier and optional parameters and selecting during the presentation classified structural elements for the second user in dependence upon the presentation control instructions and user classifications of the second user includes selecting a classified structural element in dependence upon the presentation action identifier and the parameters. In many embodiments, each presentation control instruction includes a presentation action identifier and optional parameters; and selecting, after the presentation, classified structural elements for the first user in dependence upon the recorded presentation control instructions and the user classifications of the first user includes selecting a classified structural element in dependence upon the presentation action identifier and the parameters.

Typical embodiments also include creating a session document from a presentation document, carried out by identifying a presentation document for a presentation, the presentation document including a presentation grammar and a structured document having structural elements classified with classification identifiers; identifying a user participant for the presentation, the user having a user profile including user classifications; and filtering the structured document in dependence upon the user classifications of the first user, the user classifications of the second user, and the classification identifiers. Typical embodiments also include creating a presentation document, carried out by creating, in dependence upon an original document, a structured document including one or more structural elements; classifying a structural element of the structured document according to a presentation attribute; and creating a presentation grammar for the structured document, wherein the presentation grammar for the structured document includes grammar elements each of which includes an identifier for at least one structural element of the structured document.

The foregoing and other objects, features and advantages of the invention will be apparent from the following more particular descriptions of exemplary embodiments of the invention as illustrated in the accompanying drawings

BRIEF DESCRIPTION OF THE DRAWINGS

FIG. 2 sets forth class diagrams for exemplary object oriented classes useful in implementing methods and systems for creating presentation documents according to various exemplary embodiments of the present invention.

FIG. 5 sets forth an exemplary data structure in which a full grammar may be implemented according to embodiments of the present invention.

DETAILED DESCRIPTION OF EXEMPLARY EMBODIMENTS

Introduction

The present invention is described to a large extent in this specification in terms of methods for differential dynamic content delivery. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Creating a Presentation Document

Figure 1:
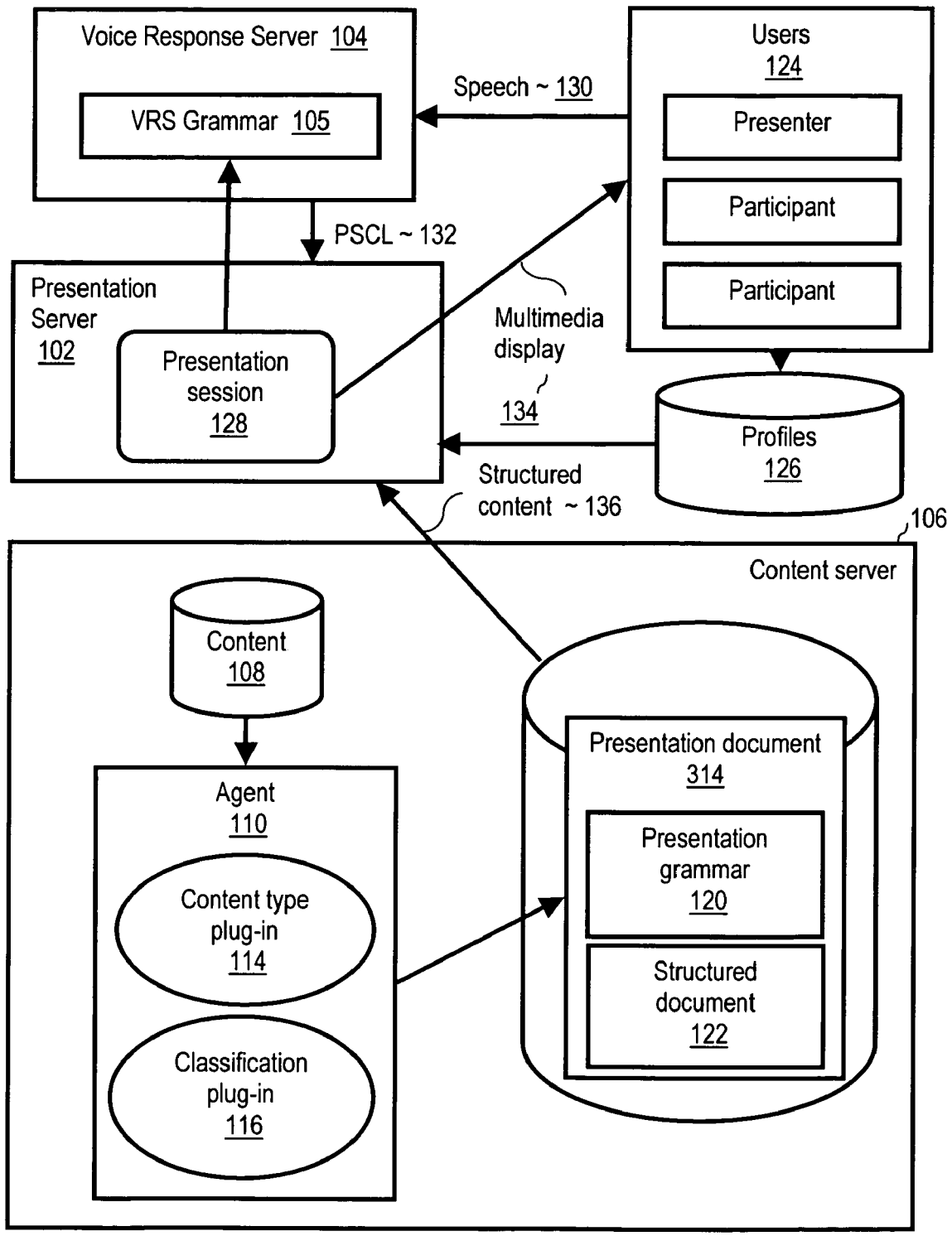
FIG. 1 sets forth a block diagram of an exemplary system architecture in which may be implemented various exemplary embodiments of the present invention.

Methods, systems, and products are now described for creating a presentation document with reference to the accompanying drawings, beginning with FIG. 1. FIG. 1 sets forth a block diagram of an exemplary system architecture in which may be implemented various exemplary embodiments of the present invention. The system of FIG. 1 include a content server (106) having stored content (108) of original documents from which presentation documents are created. Agent (110) includes software modules for creating presentation grammars for presentation documents according to content type (114) and for classifying presentation document content according to presentation attributes (116). Presentation attributes are generic selection criteria for displaying appropriate structural elements of original documents to users. Examples of presentation attributes include users' company names, department names, security levels, technical levels, and so on. User profiles (126) include user classification information typically used to filter presentation media according to presentation attributes.

Content server (106) includes storage for presentation documents (314) each of which is composed of a presentation grammar (120) and a structured document (122). A presentation grammar is a data structure that includes a set of key phrases used to identify presentation action identifiers and optional parameters for use in formulating presentation control instructions relevant to structural elements of a content type. In typical embodiments, presentation control instructions are represented by and formulated from presentation action identifiers (reference 518 on FIG. 5). Key phrases are spoken by users and presented as speech input to voice response server (104) where they are parsed and used to select a presentation action identifier (518 on FIG. 5) from a VRS grammar (105). VRS grammar (105) is formed dynamically from presentation grammars (120) in use in a presentation session (128). In some embodiments, VRS grammar (105) is formed dynamically from user grammars from user profiles (126). Presentation Session Control Language ("PSCL") stream (132) represents a stream of presentation control instructions composed of presentation action identifiers (518 on FIG. 5) and optional presentation control parameters (520 on FIG. 5) from VRS (104) to presentation server (102) which is programmed to present (134) structured multimedia content (136) from structured documents (122) to users (124) in accordance with such presentation control instructions (132).

FIG. 2 sets forth class diagrams for exemplary object oriented classes useful in implementing methods and systems for creating presentation documents according to various exemplary embodiments of the present invention. FIG. 2 includes a presentation document class (314) that includes a reference to a presentation grammar (120), a reference to a structured document (122), and a network location (202) of an original document from which the presentation document was created. In the example of FIG. 2, the network location (202) of the original document is expressed as a Uniform Resource Identifier or "URI."

FIG. 2 includes a profile class (126) whose objects represent presentation users. The profile class (126) includes a user name (204), a password (206), and a reference to a user grammar (208). A user grammar is a data structure that includes a set of key phrases that are used to select presentation action identifiers specific to a user for use in formulating presentation control instructions. For a presentation control instruction that instructs a presentation session to carry out the presentation action 'page down,' for example, an individual user may chose to associate with that presentation control instruction the key phrase "rock and roll" or "boogie on down" or any other key phrase favored by a user as will occur to those of skill in the art. Although these particular examples are somewhat fanciful, in fact, user grammars serve a useful purpose by providing key phrases for presentation control instructions that distinguish normal speech. In a discussion of a word processing document, for example, references to pages and paragraphs may abound, and using a distinctive phrase to invoke presentation control instructions on pages and paragraphs reduces the risk of confusion on the part of a voice response server and a presentation session.

The profile class (126) also includes a string array storing user classifications (210). Examples of user classifications (210) include any supported data codes describing users, including, for example "company=IBM," "department=marketing," "technical level=3," "security level=2," and others as will occur to those of skill in the art.

FIG. 2 includes a presentation session class (128) whose objects represent presentation sessions. A presentation session represents an aggregation of presentation documents for presentation usually at a set date and time, for a defined set of users including a presenter in charge. The presentation session class (128) includes a presentation identifier code (212), a presenter identification (214), a list of participants (216). The presentation session class (128) also includes a schedule date and time (218) when a presentation is to be presented, a URI array identifying presentation documents (220) requested by a presenter for a presentation session, a URI array identifying presentation documents that have been filtered according to presentation attributes or user classifications (220). The presentation session class (128) also includes a member method named mergeGrammars( ) (224) that is programmed to read presentation grammars from presentation documents and store them in a VRS grammar on a voice response server for use in parsing key phrases spoken by a presenter and other users into presentation control instructions.

Agent (110) includes software modules for structuring a presentation document according to content type (114) and for classifying presentation document content according to presentation attributes (116).

FIG. 2 includes an exemplary agent class (110) whose objects are used in content servers to create presentation documents. Agent class (110) includes an array of references to content type plug-ins (114) that are used to create presentation grammars for presentation documents according to content type. FIG. 2 also shows a content type plug-in class (114) with a member method named createPresentationGrammar( ) (232) which in this example is programmed to create presentation grammars for presentation documents according to content type. Agent class (110) also includes an array of references to classification plug-ins (116) that are used to classify presentation document content according to presentation attributes (116). FIG. 2 also shows a classification plug-in class (116) with a member method named classifyDocument( ) (234) which in this example is programmed to classify presentation document content according to presentation attributes.

Agent class (110) also includes a member method named createStructuedDocument( ) (232) which is programmed to convert an original document into a structured document by inserting structural element identifiers. Examples of structural element identifiers include , <paragraph>, <row>, <column>, <cell>, <slide>, <jpeg>, <title>, <heading>, <subheading>, and so on, as will occur to those of skill in the art. These examples of structural elements identifiers are expressed as markup tags such as would be used, for example, in a markup language such as HTML ("HyperText Markup Language") or XML ("eXtensible Markup Language"), although this is not a limitation of the invention. In fact, it is well within the scope of the present invention to implement structural element identifiers with binary codes, Unicode identifiers, or by use of other structure identifiers as will occur to those of skill in the art.

Figure 3:
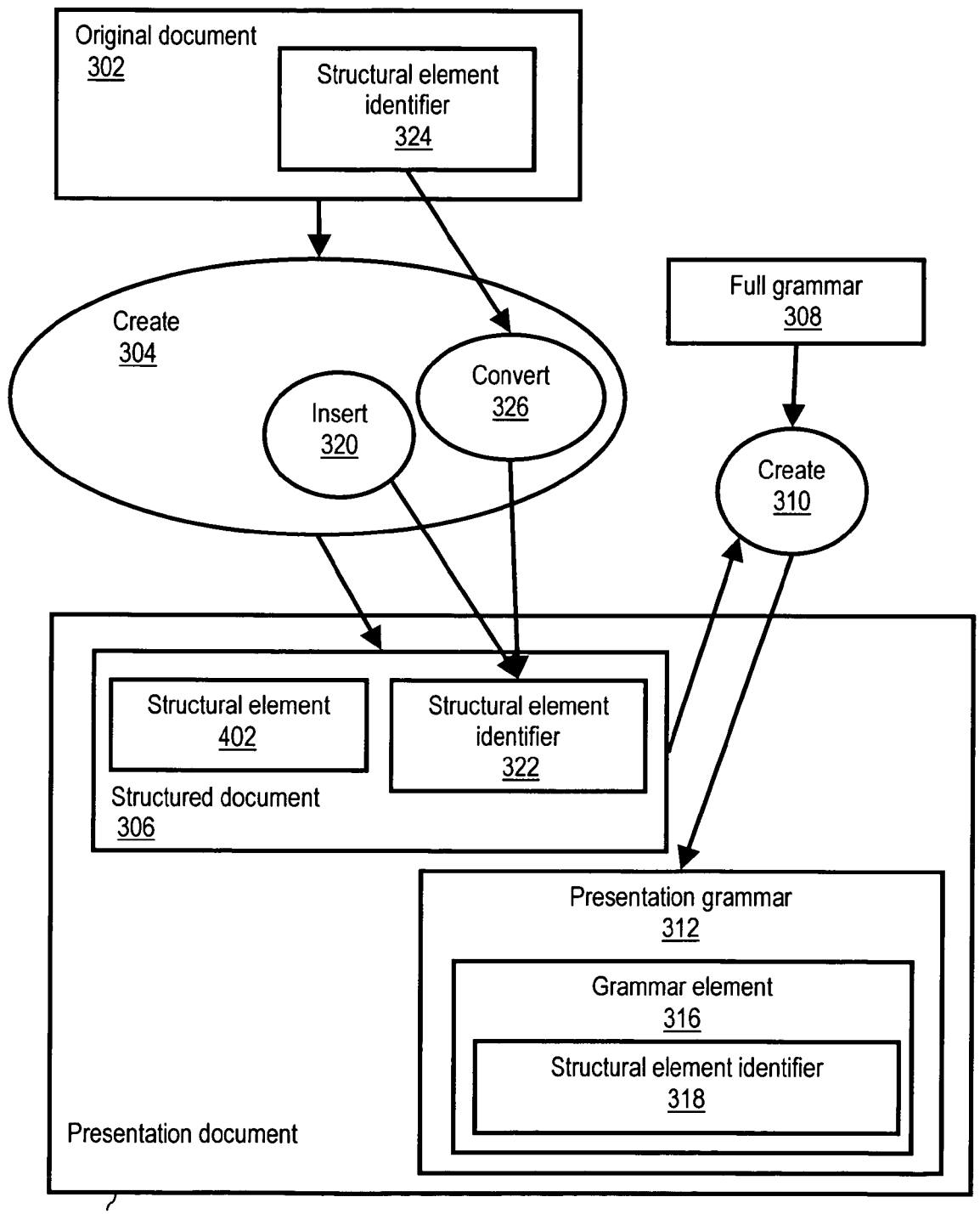
FIG. 3 sets forth a data flow diagram illustrating a method for creating a presentation document.

FIG. 3 sets forth a data flow diagram illustrating a method for creating a presentation document (314) that includes creating (304), in dependence upon an original document (302), a structured document (306) comprising one or more structural elements (402). In the method of FIG. 3, creating (304) a structured document (306) is carried out by inserting (320) in the structured document (306) structural element identifiers (322) for the structural elements (402). An alternative method of creating a structured document, also shown in FIG. 3, is carried out by converting (326) existing structural element identifiers (324) from the original document (302) to structural element identifiers (322) for the structural elements (402) of the structured document (306). The method of FIG. 3 also includes creating (310) a presentation grammar (312) for the structured document (306). In the example of FIG. 3, the presentation grammar (312) for the structured document (306) includes grammar elements (316) each of which includes a structural element identifier (318) for at least one structural element (402) of the structured document (306).

Figure 4:
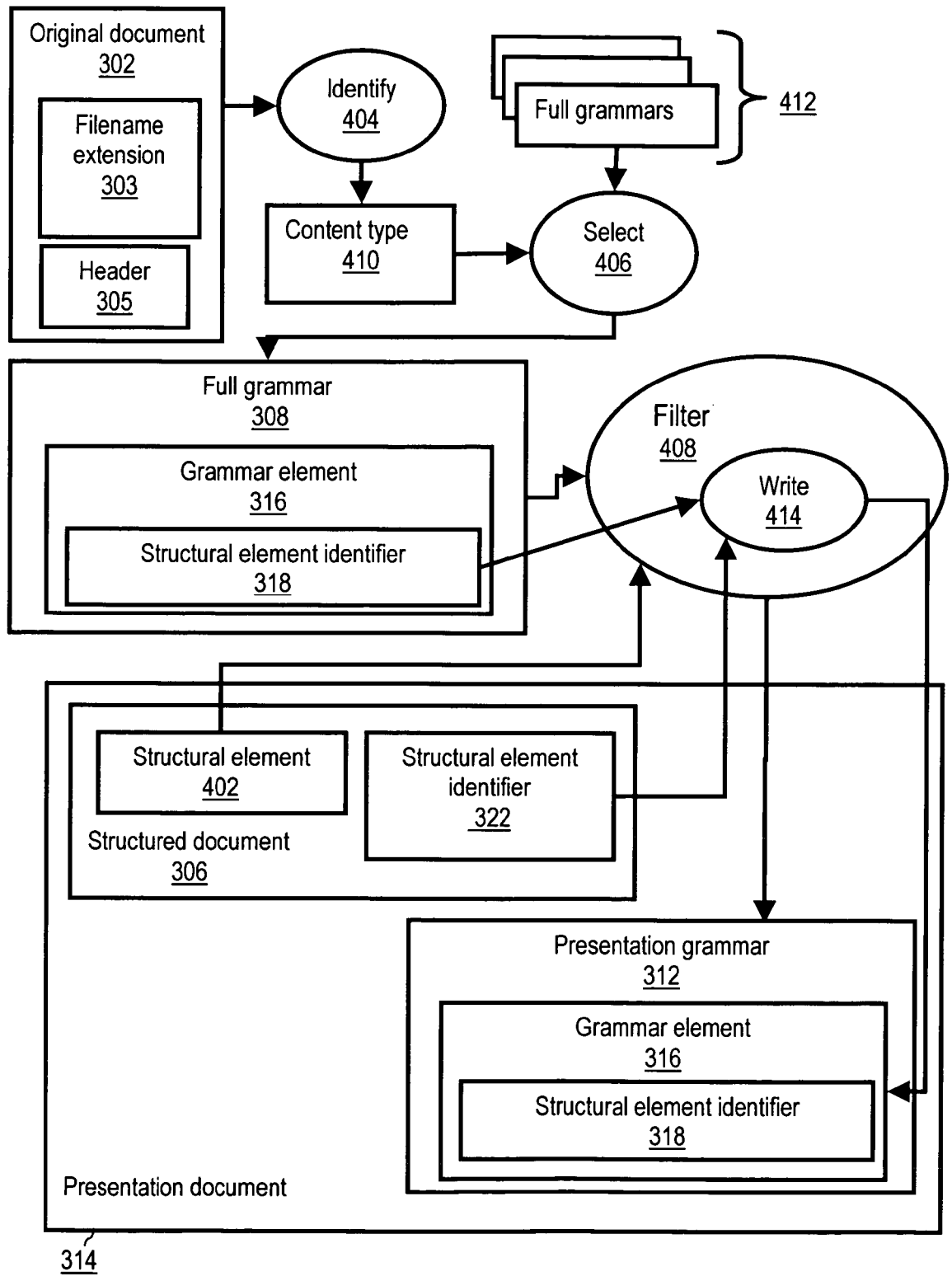
FIG. 4 sets forth a data flow diagram illustrating an exemplary method of creating a presentation grammar.

FIG. 4 sets forth a data flow diagram illustrating an exemplary method of creating a presentation grammar (312) for a structured document (314) that includes identifying (404) the content type (410) of the original document (302). Identifying the content type may be carried out, for example, by identifying the content type in dependence upon a filename extension (303) in the filename of an original document. Examples of filename extension identifying content type include 'pdf' for Adobe's Portable Document Format, 'xls' for a Microsoft Excel™ spreadsheet, 'doc' for a word processing document, 'xml' for an XML document, and so on, as will occur to those of skill in the art. Alternatively, identifying the content type may be carried out by identifying the content type in dependence upon document header elements in an original document (302). The following is an example of an HTML header identifying an original document having content type HTML version 4.01:

<!DOCTYPE HTML PUBLIC "-//W3C//DTD HTML 4.01//EN""http://www.w3.org/TR/html4/strict.dtd">

The method of FIG. 4 includes selecting (406), in dependence upon the content type (410), a full presentation grammar (308) from among a multiplicity of full presentation grammars (412). A full presentation grammar may be implemented, for example, as shown in FIG. 5. A multiplicity of full presentation grammars may be implemented in a data structure similar to the one shown in FIG. 5 by adding a content type column. FIG. 5 sets forth an exemplary data structure (308) in which a full grammar may be implemented according to embodiments of the present invention. The full grammar of FIG. 5 includes several grammar elements (502-514) for a content type. In this example, the content type is taken as a word processing document having structural elements that include pages, paragraphs, bullets, titles, subtitles, and so on, and the data structure includes a column for an identifier (318) of a structural element, a column for a key phrase (516) for formulating a presentation control instruction for invoking a presentation action, and a column for a presentation action identifier (518) representing a presentation action. The exemplary data structure of FIG. 5 also includes a column for a data indication whether a presentation control instruction requires a parameter. The exemplary grammar entries for presentation action identifiers PgDn (502), PgUp (504), nextParagraph (508), and prevBullet (512) have parameter (520) values of 'null,' signifying that a voice response server parsing their key phrases into presentation control instructions is not to parse a parameter for a presentation control instruction. The exemplary grammar entries for presentation action identifiers goToPage (506), nextHeading (510), and goToSubtitle (514), however, have parameter (520) values of 'integer' and 'string,' signifying that a voice response server parsing their key phrases into presentation control instructions is to seek to parse for each of them respectively an integer parameter, a string parameter, and a string parameter.

The method of FIG. 4 includes filtering (408) the full presentation grammar (308) into a presentation grammar (312) for the structured document (306) in dependence upon the structural elements (402) of the structured document (306). Filtering (408) the full presentation grammar (308) may be carried out by writing (414) from the full presentation grammar (308) to the presentation grammar (312) for the structured document (306) each grammar element (316) having a structural element identifier (318) of a structural element (402) that occurs in the structured document (306). Using the exemplary full grammar of FIG. 5, for example, to create a presentation grammar for a structured document having structural elements including pages, paragraphs, headings, and subtitles but no bullet points identified in it as structural elements, filtering (408) the full presentation grammar (308) by writing (414) to the presentation grammar (312) grammar elements (502-510) plus grammar element (514) but excluding grammar element (512).

Methods of creating presentation documents are further explained with an exemplary use case. Consider the following example of a structured document:

```
<document>

<p id="1">a paragraph</p>
        <p id="2">another paragraph</p>
        <image id="1">a graphic image</image>

<p id="3">a paragraph</p>
        <p id="4">another paragraph</p>
        <image id="2">another graphic image</image>

</document>
```

And assume that this exemplary structured document is associated in a presentation document with the following presentation grammar:

TABLE 1

| | Presentation Grammar | | |
|---|---|---|---|
| Key Phrase | Presentation Action Identifier | Structural Element Identifier | Parameter |
| page down | PgDn | <page> | null |
| page up | PgUp | <page> | null |
| go to page | goToPage | <page> | integer |
| next paragraph | nextParagraph | <p> | null |
| go to paragraph | goToParagraph | <p> | integer |
| next image | nextImage | <image> | null |
| go to image | goToImage | <image> | integer |

This example is discussed with reference to the exemplary system architecture of FIG. 1. In this example, then, when a presentation session (128) displays the first page of the structured document and a user (124) speaks the words "page down," a voice response server (104), having this presentation grammar as part of its VRS grammar (105), parses the speech into a presentation control instruction having a presentation control identifier named "PgDn" and communicates the presentation control instruction through a presentation interface (132) to the presentation session in presentation server (102) which then displays the next page, in this example, page 2 of the example structured document. Similarly, when the first page of the structured document is on display, a user's speaking the words "go to paragraph 4" results in the presentation session's changing the display to show paragraph 4 on the second page of the document. And, when the first page is on display for the users participating in the presentation and a user speaks the words "next image," the presentation session changes the display to show image 2 on the second page of the document.

Classifying Structure Elements in a Presentation Document

Figure 6:
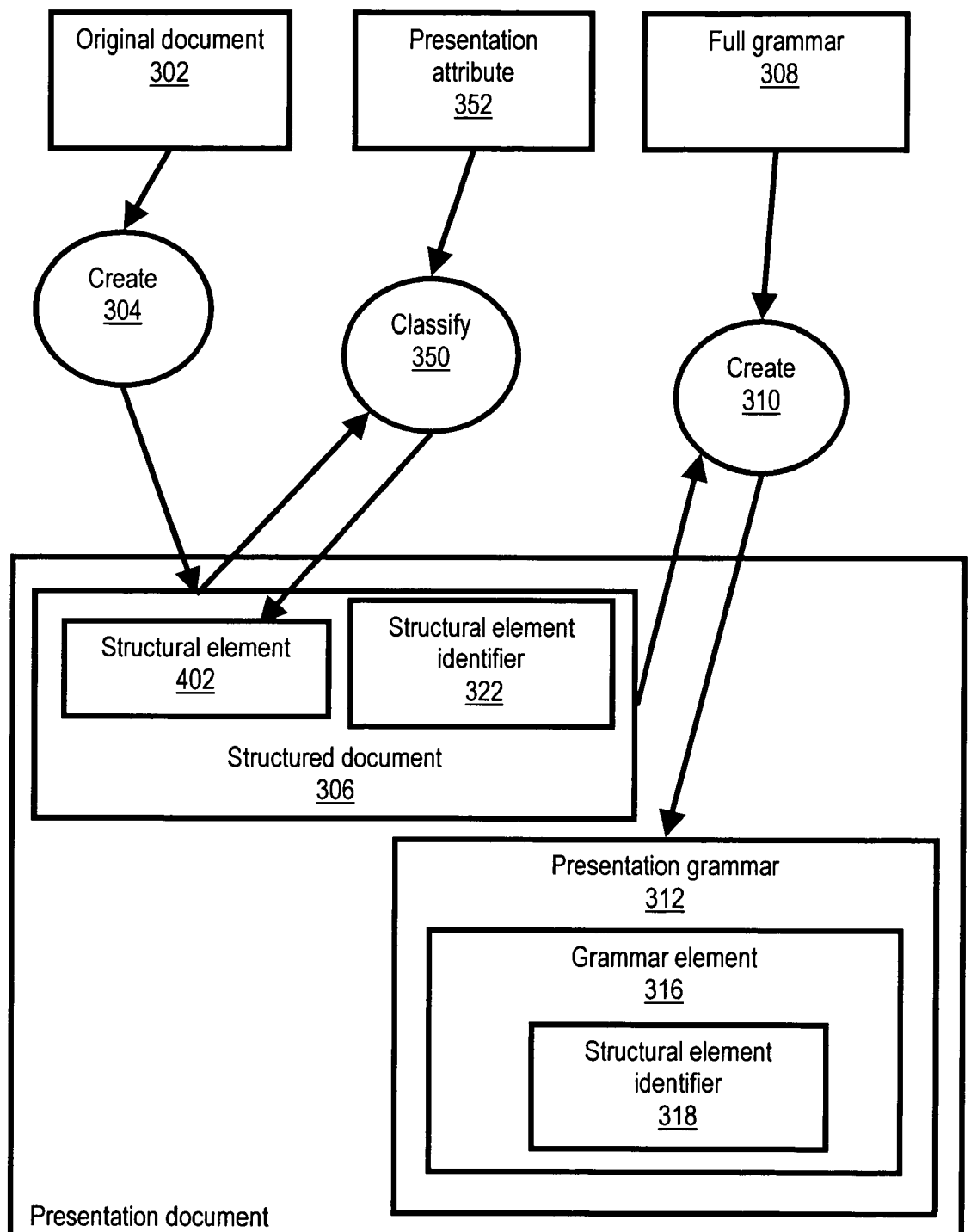
FIG. 6 is a data flow diagram illustrating a further method for creating a presentation document.
Figure 7:
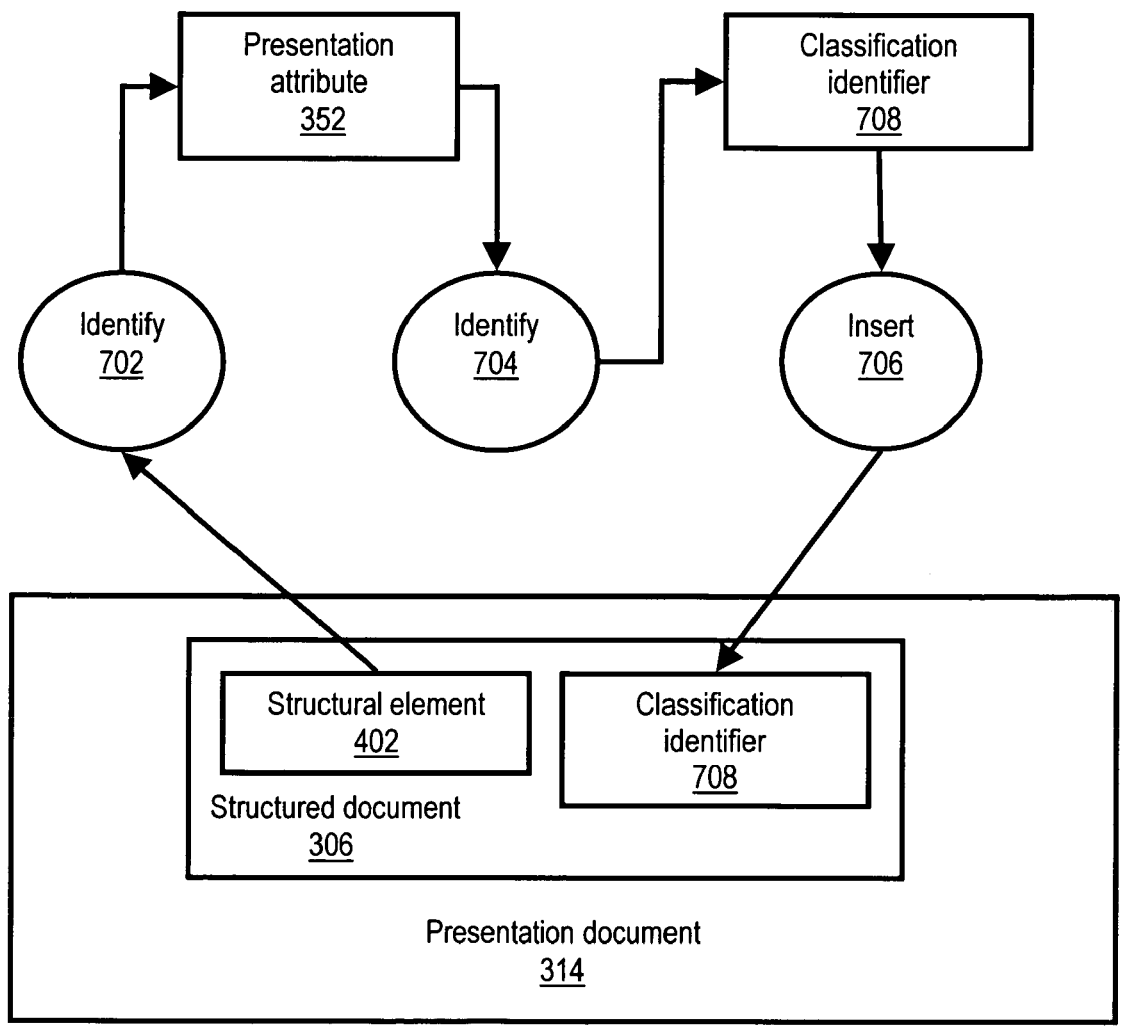
FIG. 7 is a data flow diagram illustrating an exemplary method for classifying a structural element.

FIG. 6 is a data flow diagram illustrating a further method for creating a presentation document (314). The method of FIG. 6 includes creating (304), in dependence upon an original document (302), a structured document (306) comprising one or more structural elements (402), as explained in detail above. The method of FIG. 6 also includes classifying (330) a structural element (402) of the structured document (306) according to a presentation attribute (352). FIG. 7 is a data flow diagram illustrating an exemplary method for classifying a structural element that includes identifying (702) a presentation attribute (352) for the structural element (402); identifying (704) a classification identifier (708) in dependence upon the presentation attribute (352); and inserting (706) the classification identifier (708) in association with the structural element (402) in the structured document (306). The method of FIG. 6 also includes creating (310) a presentation grammar (312) for the structured document (306), wherein the presentation grammar (312) for the structured document (306) includes grammar elements (316) each of which includes an identifier (318) for at least one structural element (402) of the structured document (306).

Figure 8:
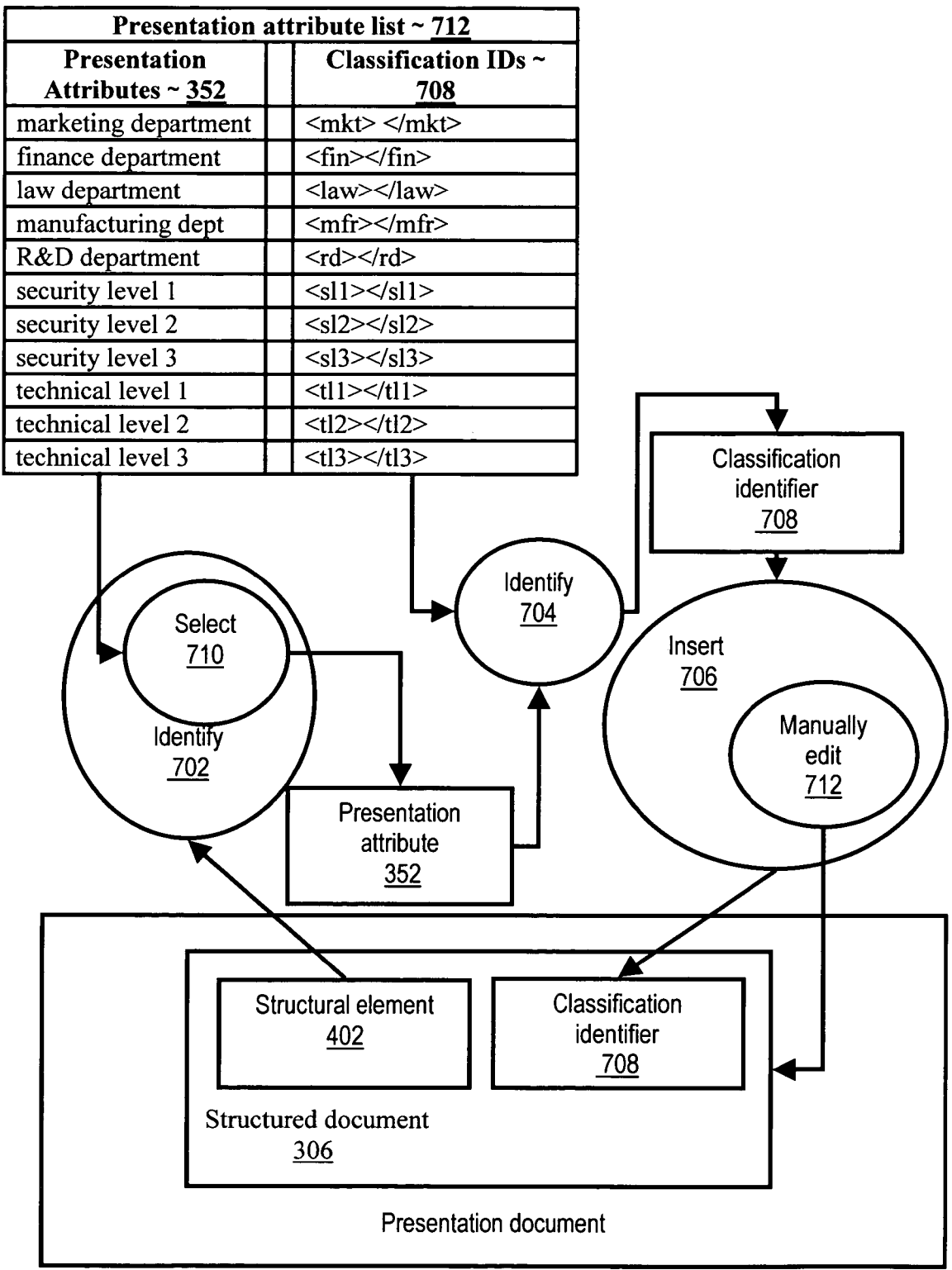
FIG. 8 sets forth a data flow diagram illustrating an exemplary method for classifying a structural element in a structured document.

FIG. 8 sets forth a data flow diagram illustrating an exemplary method for classifying a structural element in a structured document in which identifying (702) a presentation attribute (352) for the structural element (402) includes selecting (710) a presentation attribute (352) from a list (712) of supported presentation attributes (352). The presentation attribute list (712) of FIG. 8 includes two columns, one column for presentation attributes (352) and another column for associated classification identifiers (708). In the method of FIG. 8, identifying (704) a classification identifier (708) is carried out by identifying a classification identifier (708) associated with the presentation attribute (352) on the list (712). In the method of FIG. 8, inserting (706) the classification identifier (708) includes manually editing (712) the structured document (306) to insert classification identifiers in appropriate locations to classify structural elements in a structured document. For example, a paragraph to be viewed only by members of the marketing department may be classified by tagging the paragraph with <mkt></mkt>.

Figure 9:
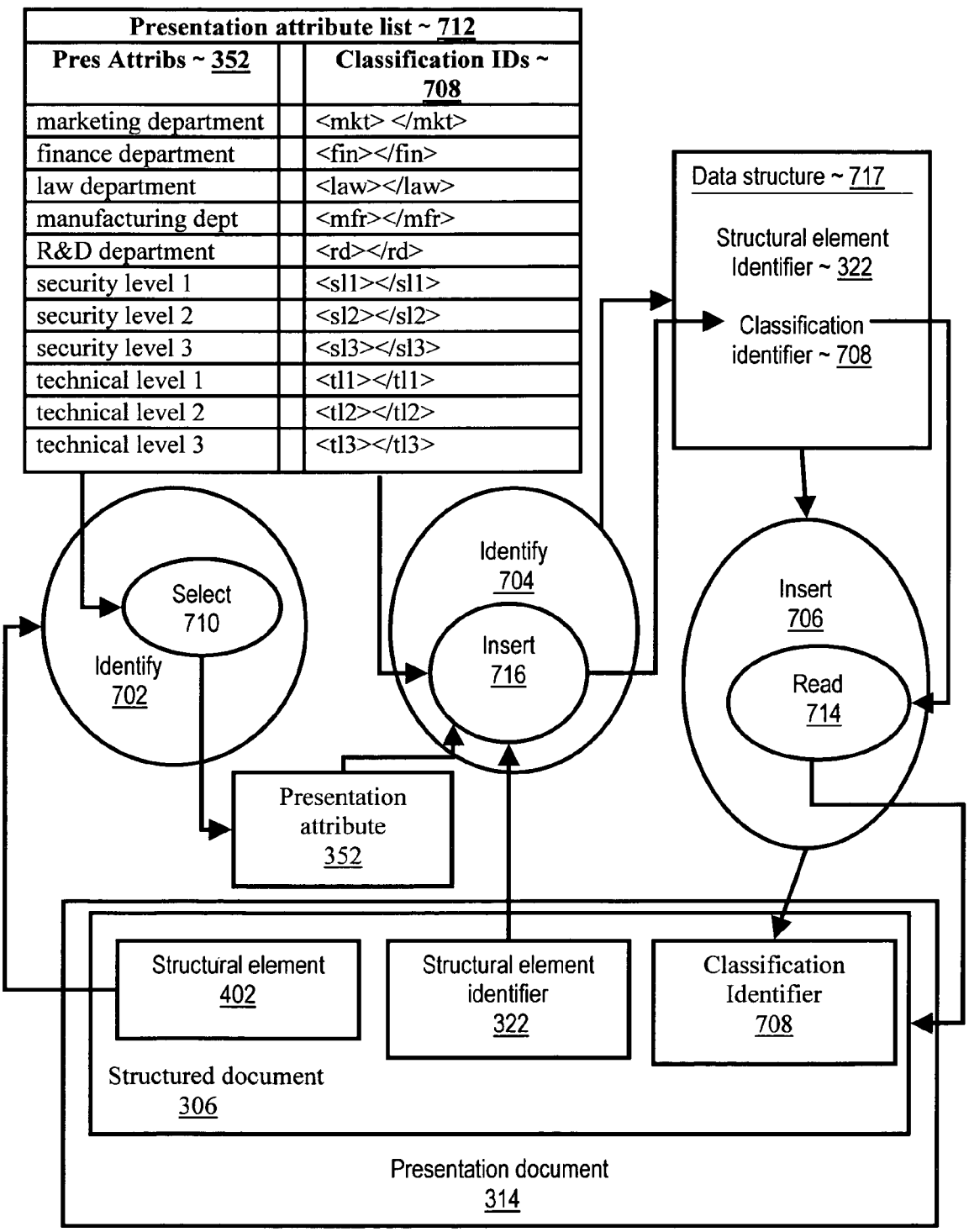
FIG. 9 sets forth a data flow diagram illustrating a further exemplary method for classifying a structural element in a structured document.

FIG. 9 sets forth a data flow diagram illustrating a further exemplary method for classifying a structural element in a structured document in which identifying (702) a presentation attribute (352) for the structural element (402) includes selecting (710) a presentation attribute (352) from a list (712) of supported presentation attributes (352), the presentation attribute (352) having an associated classification identifier (708). In the method of FIG. 9, identifying (704) a classification identifier (708) includes inserting (716) the classification identifier (708) in a data structure (717) in association with a structural element identifier (322) for the structural element (402). In the method of FIG. 9, inserting (706) the classification identifier (708) in the structured document (306) includes reading (714) the classification identifier (708) from the data structure (717) in dependence upon the structural element identifier (322).

Figure 10:
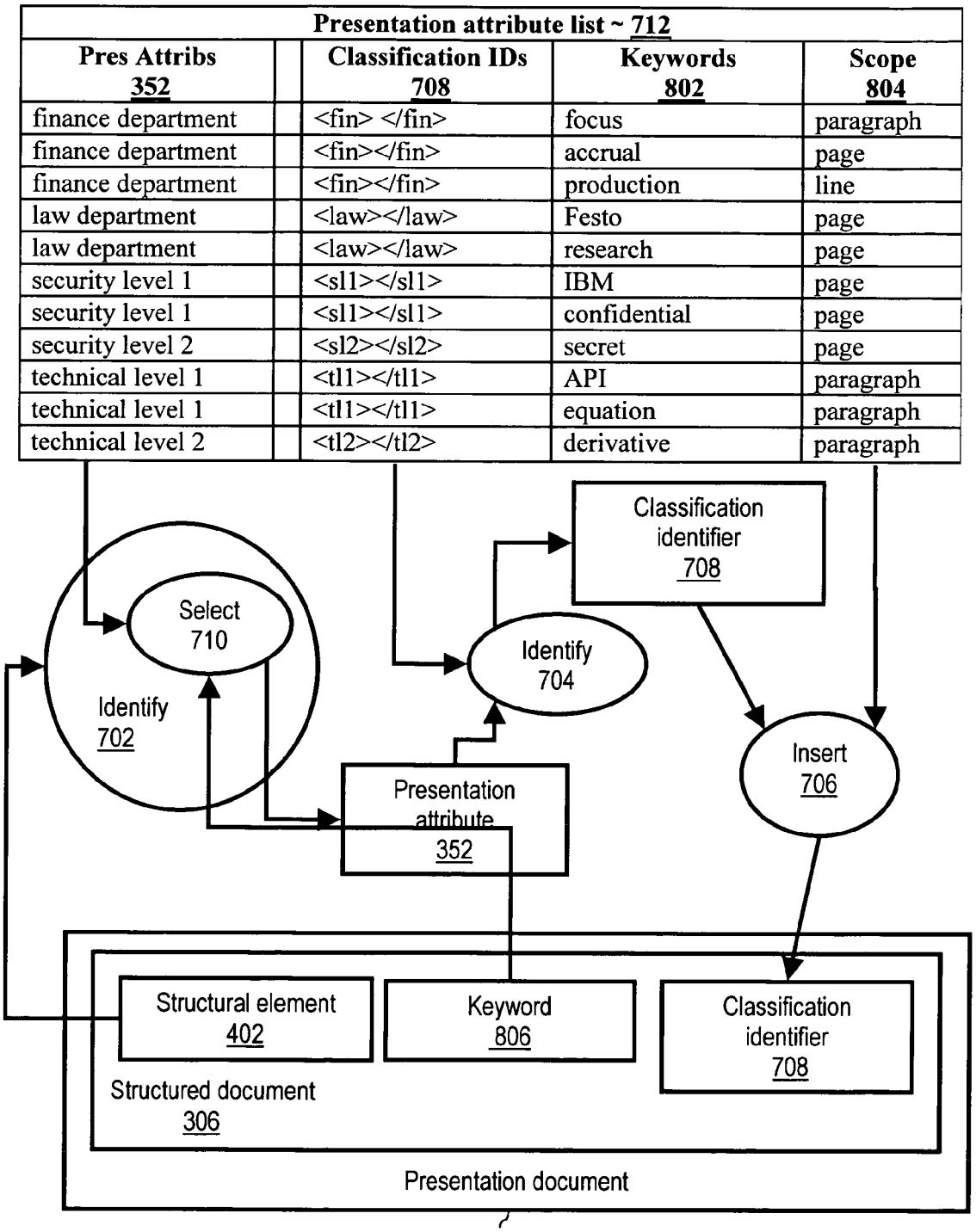
FIG. 10 sets forth a data flow diagram illustrating another exemplary method for classifying a structural element in a structured document.

FIG. 10 sets forth a data flow diagram illustrating another exemplary method for classifying a structural element in a structured document that includes providing a list (712) of supported presentation attributes (352) including at least one keyword (802) and at least one indication of structural insertion scope (804) for each presentation attribute (352). In the method of FIG. 10, identifying (702) a presentation attribute (352) for the structural element (402) includes selecting (710) a presentation attribute (352) from the list (712) in dependence upon a keyword (806) from the structured document (306). In the method of FIG. 10, identifying (704) a classification identifier (708) is carried out by identifying a classification identifier (708) associated with the presentation attribute (352) on the list (712). In the method of FIG. 10, inserting (706) the classification identifier (708) is carried out by inserting the classification identifier (708) in the structured document (306) according to a structural insertion scope (804) for the selected presentation attribute (352).

Figure 11:
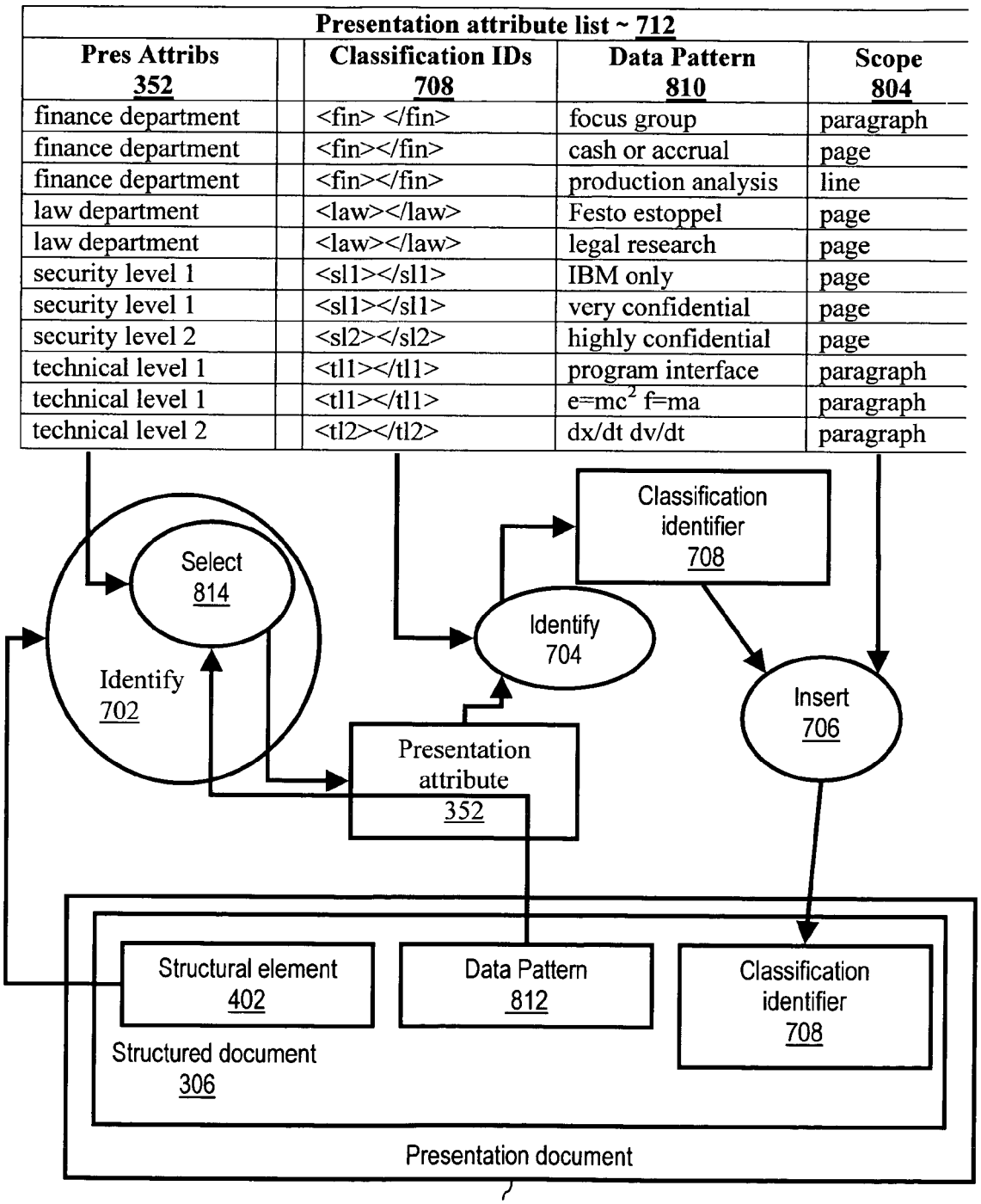
FIG. 11 sets forth a data flow diagram illustrating a further exemplary method for classifying a structural element in a structured document.

FIG. 11 sets forth a data flow diagram illustrating a further exemplary method for classifying a structural element in a structured document that includes providing a list (712) of supported presentation attributes (352) including at least one data pattern (810) and at least one indication of structural insertion scope (804) for each presentation attribute (352). In the method of FIG. 11, identifying (702) a presentation attribute (352) for the structural element (402) includes selecting (814) a presentation attribute (352) from the list (712) in dependence upon a data pattern (812) from the structured document (306). In the method of FIG. 11, identifying (704) a classification identifier (708) is carried out by identifying a classification identifier (708) associated with the presentation attribute (352) on the list (712). In the method of FIG. 11, inserting (706) the classification identifier (708) is carried out by inserting the classification identifier (708) in the structured document (306) according to a structural insertion scope (804) for the selected presentation attribute (352).

Methods of creating presentation documents are further explained with an exemplary use case. Consider the following example of a structured document:

```
<document>

<p id="1">
      a paragraph on an introductory subject
    </p>

<p id="2">
      a paragraph on a particular subject
    </p>
    <tech level="2">
      <p id="2">
        a more technical paragraph on the same subject
      </p>
    </tech>
    <security level="2">
      <p id="2">
        a more secret paragraph on the same subject
      </p>
    </security>
    <dept id="marketing">
      <p id="2">
        a paragraph on the same subject with added detail
        regarding marketing
      </p>
    </dept>
    <company id="IBM">
      <p id="2">
        a paragraph on the same subject with added detail
        pertinent to a user's company
      </p>
    </company>
    <p id="3">
      a paragraph on a further subject
    </p>
    ... ... ...

... ... ...

... ... ...
</document>
```

This example is discussed with reference to the exemplary system architecture of FIG. 1, assuming that this exemplary structured document is associated in a presentation document with a presentation grammar that includes presentation action identifiers for paragraphs and pages uploaded to a VRS grammar (105) in a voice response server (104). In this example, then, when a presentation session (128) is displaying the first page of the structured document and a user (124) speaks the words "next page," a voice response server (104) parses the speech into a presentation control instruction with a presentation action identifier named "PgDn" and communicates the presentation control instruction through a presentation interface (132) to the presentation session which then displays the next page, in this example, page 2 of the example structured document. Assume that there are five users (124) registered as participants with the presentation session (128), and note that there are five different versions of paragraph 2 on page two of the structured document.

In this example, a first version of paragraph 2 bears a structural identifier <p></p> identifying it as a paragraph, but this first version of paragraph 2 bears no classification identifier. In this example, presentation session (128) is programmed to display this unclassified version of paragraph 2 to users having either the lowest technical classifications, the lowest security classifications, or no particular technical or security classifications at all. Moreover, in an example, where there were only one version of paragraph 2, all users would be presented with that one version.

In this example, a second version of paragraph 2 is classified with a classification identifier <tech level="2">. In this example, presentation session (128) is programmed to display this second version of paragraph 2 to users having user classification indicating technical level 2. That is, when a user having technical level 2 in the user's profile classifications (210 on FIG. 2) is registered with the presentation session, upon being directed to display paragraph 2, rather than displaying an unclassified version of paragraph 2, the presentation session displays the second version of paragraph 2 classified <tech level="2"> to such a user.

Similarly, a user having a user profile classification representing a heightened security authorization, security level 2, is shown the version of paragraph 2 classified by the classification identifier <security level="2">. A user having a user profile classification identifying the user as a member of the marketing department is shown the version of paragraph 2 classified by the classification identifier <dept id="marketing">. A user having a user profile classification identifying the user as an employee of IBM is shown the version of paragraph 2 classified by the classification identifier <company id="IBM">.

For purposes of clarity of explanation, the structural elements in this example are shown with only one classification per element. Persons of skill in the art will recognize, however, that it is well within the scope of the present invention for a structural element of a structured document to be classified with any number of classification identifiers.

Creating a Voice Response Grammar from a Presentation Grammar

Figure 12:
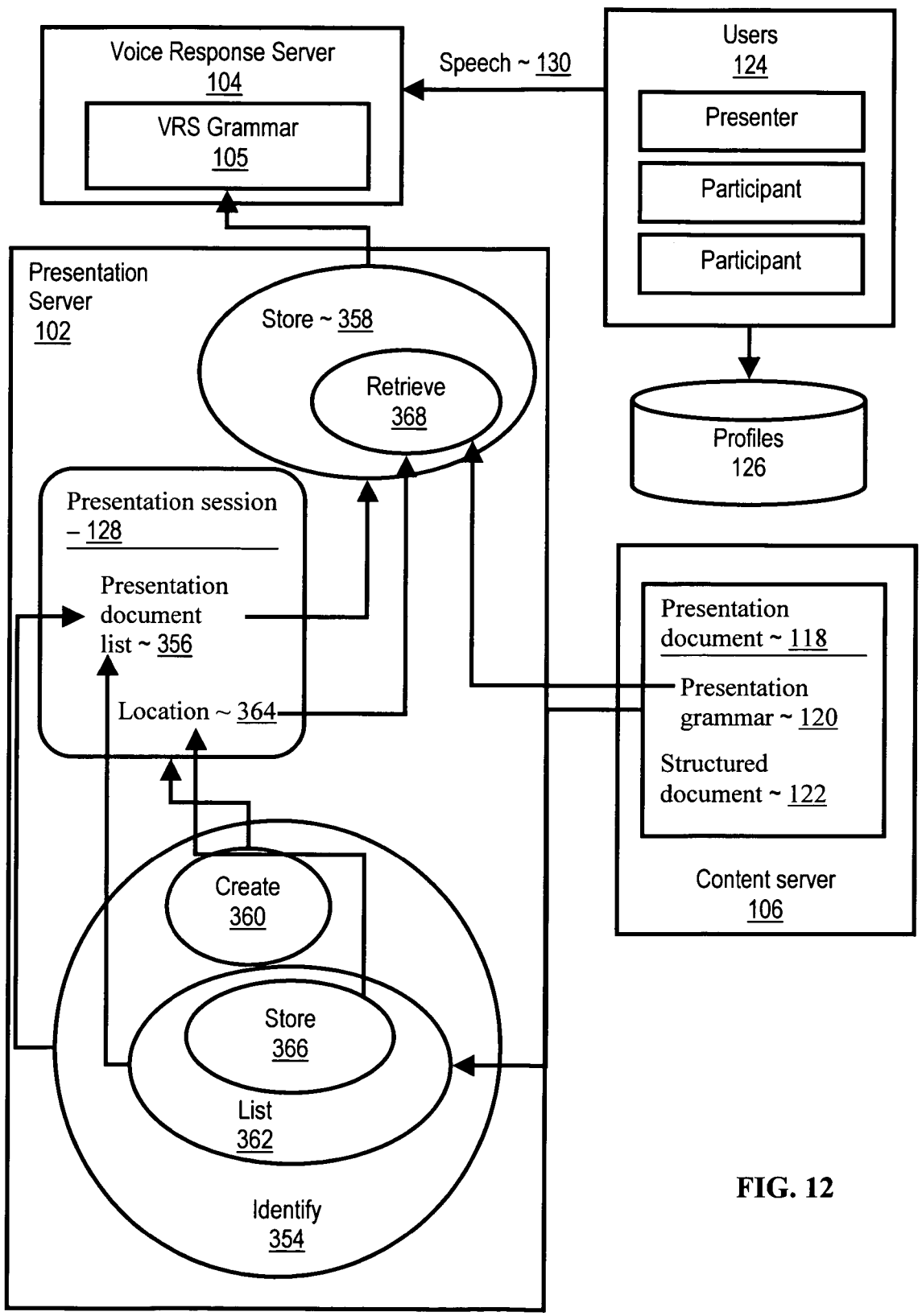
FIG. 12 sets forth a data flow diagram illustrating an exemplary method for creating a voice response grammar in a voice response server.

FIG. 12 sets forth a data flow diagram illustrating a method for creating a voice response grammar in a voice response server including identifying (354) presentation documents (118) for a presentation. In the method of FIG. 4, each presentation document has a presentation grammar (120), and the method includes storing (358) each presentation grammar (120) in a voice response grammar (105) on a voice response server (104). Presentation grammars and voice response grammars may be structured like the full grammars illustrated in FIG. 5 with grammar elements (502-514) for a content type (410). In the exemplary grammar structure of FIG. 5, the content type is taken as a word processing document having structural elements that include pages, paragraphs, bullets, titles, subtitles, and so on, and the data structure includes a column for an identifier (318) of a structural element, a column for a key phrase (516) for formulating a presentation control instruction to invoke a presentation action, and a column for a presentation action identifier (518) representing a presentation action.

In the method of FIG. 12, identifying (354) presentation documents (118) for a presentation includes creating (360) a data structure (128) representing a presentation and listing (362) at least one presentation document (118) in the data structure (128) representing a presentation. A data structure representing a presentation may be implemented as an instance of a presentation session class as shown at reference (128) on FIG. 2. In the method of FIG. 12, listing (362) the at least one presentation document (118) includes storing (366) a location (364) of the presentation document (118) in the data structure (128) representing a presentation. In the exemplary structure of FIG. 2, storing a location of a presentation document may be implemented by storing presentation document locations in the form of URIs in an array of URIs (220). In the method of FIG. 12, storing (358) each presentation grammar (120) includes retrieving (368) a presentation grammar (120) of the presentation document (118) in dependence upon the location (364) of the presentation document (118).

In one exemplary embodiment of the method of FIG. 12, the presentation document (118) is implemented as a file in a file system on a content server (106) and the file has a location (364) identified by a pathname. In such an embodiment, storing (366) a location (364) of the presentation document (118) in the data structure (128) representing a presentation includes storing the pathname and a network location of the content server. An example of storing a pathname and a network location is storing a URI for the document in a URI array such as that illustrated at reference (220) on FIG. 2. Such a URI may have the form:

http://www.someContentServer.com/presentationDocuments/myDoc.doc where www.someContentServer.com is a domain name for a web server that maps to a network address such as an Internet Protocol address, for example, of a computer where a web server is located. A 'web server' is a server that supports data communications according the HyperText Transport Protocol ('HTTP'). The portion of the URI after the domain name, "presentationDocuments/myDoc.doc," is a pathname for a document on the computer on which the web server is located. In such an embodiment, retrieving (368) a presentation grammar includes retrieving the presentation document from the content server (106) in dependence upon the pathname and extracting the grammar from the presentation document. In an example where the presentation document is located according to a URI as described above and the content server is implemented with a web server, retrieving the presentation document from the content server may be carried out by parsing the URI into an HTTP GET message:

GET /presentationDocuments/myDoc.doc HTTP/1.1 and transmitting the GET message to the content server at www.ibmContentServer.com.

In this example, the content server returns the presentation document as URI encoded data in an HTTP RESPONSE message. In an example where the returned presentation document has this form:

```
<presentationDocument>
    <presentationGrammar>
        <grammarElement>
            <contentType id="WP">
```

-continued

```
      <keyPhrase>
        page down
      </keyPhrase>
      <presentationAction id="PgDn">
      <structuralElementIdentifier id="page">
    </grammarElement >
  </presentationGrammar>
  <structuredDocument>

<p id="1"> a paragraph </p>
      <p id="2"> another paragraph </p> some text 
  </structuredDocument>
</presentationDocument>,
``` extracting the grammar from the presentation document may be carried out by extracting the portion of the presentation document identified by the tags:

<presentationGrammar></presentationGrammar>

In another exemplary embodiment of the method of FIG. 12, the presentation document (118) is implemented as an instance of an object oriented class on a content server (106). In this example, the presentation document has a presentation document name, and the presentation grammar comprises a member data element of the instance. In such an embodiment, storing (366) a location (364) of the presentation document (118) in the data structure (128) representing a presentation includes storing the presentation document name and a network location of the content server.

An example of storing a pathname and a network location is storing a URI for the document in a URI array such as that illustrated at reference (220) on FIG. 2. Such a URI may have the form:

http://www.ibmContentServer.com/cgi-bin/
getPresentationGrammar?presDoc=myDoc.doc where www.someContentServer.com is a domain name for a web server. The portion of the URI after the domain name but before the question mark, "servlets/ getPresentationGrammar," is a pathname for server-side functionality for retrieving a presentation document. The server-side functionality could be a CGI (Common Gateway Interface ('CGI') script or other server-side functionality as will occur to those of skill in the art, but in this example the server-side functionality is taken as a Java servlet identified by its name, "getPresentationGrammar." The remainder of the URI is query data encoded as a name-value pair identifying the name of a presentation document, "myDoc.doc," from which a presentation grammar is to be extracted by the servlet.

In such an exemplary embodiment, retrieving (368) a presentation grammar is carried out by requesting the presentation grammar (120) from the content server (106), including communicating the presentation document name as a request parameter; and receiving the presentation grammar (120) in response from the content server (106). In an example where the presentation document is located according to a URI as described above and the content server is implemented with a web server, requesting the presentation grammar (120) from the content server (106), including communicating the presentation document name as a request parameter, may be carried out by parsing the URI into an HTTP GET message:
GET/servlets/
getPresentationGrammar?presDoc=myDoc.doc HTTP/1.1 and transmitting the GET message to the content server at www.ibmContentServer.com.

In another exemplary embodiment of the method of FIG. 12, the presentation document (118) includes a record in a table in a database on a content server (106). In this example, the presentation document has a presentation document identifier, and the presentation grammar comprises a field in the record. In such an embodiment, storing (366) a location (364) of the presentation document (118) in the data structure (128) representing a presentation includes storing the presentation document identifier and a network location of the content server. In a database table in which each record represents a presentation document, for example, the presentation document identifier may be implemented as a single field unique key such as a serial number for a record, as a presentation document name, or as any functional identifier as will occur to those of skill in the art. In the continuing discussion of this example, the presentation document identifier is taken as a presentation document name.

An example of storing a presentation document identifier and a network location is storing a URI for the document in a URI array such as that illustrated at reference (220) on FIG. 2. Such a URI may have the form:

http://www.ibmContentServer.com/cgi-bin/
getPresentationGrammar?presDoc=myDoc.doc where www.someContentServer.com is a domain name for a web server. The portion of the URI after the domain name but before the question mark, "/cgi-bin/getPresentationGrammar," is a pathname for server-side functionality for retrieving a presentation document. The server-side functionality could be a Java servlet or other server-side functionality as will occur to those of skill in the art, but in this example the server-side functionality is taken as a CGI script named "getPresentationGrammar." The remainder of the URI is query data encoded as a name-value pair identifying the name of a presentation document, "myDoc.doc," from which a presentation grammar is to be extracted by the CGI script.

In such an exemplary embodiment, retrieving (368) a presentation grammar is carried out by requesting the presentation grammar (120) from the content server (106), including communicating the presentation document name as a request parameter; and receiving the presentation grammar (120) in response from the content server (106). In an example where the presentation document is located according to a URI as described above and the content server is implemented with a web server, requesting the presentation grammar (120) from the content server (106), including communicating the presentation document name as a request parameter, may be carried out by parsing the URI into an HTTP GET message:
GET /cgi-bin/getPresentationGrammar?presDoc=myDoc.doc HTTP/1.1 and transmitting the GET message to the content server at www.ibmContentServer.com.

Creating a Voice Response Grammar from a User Grammar

Figure 13:
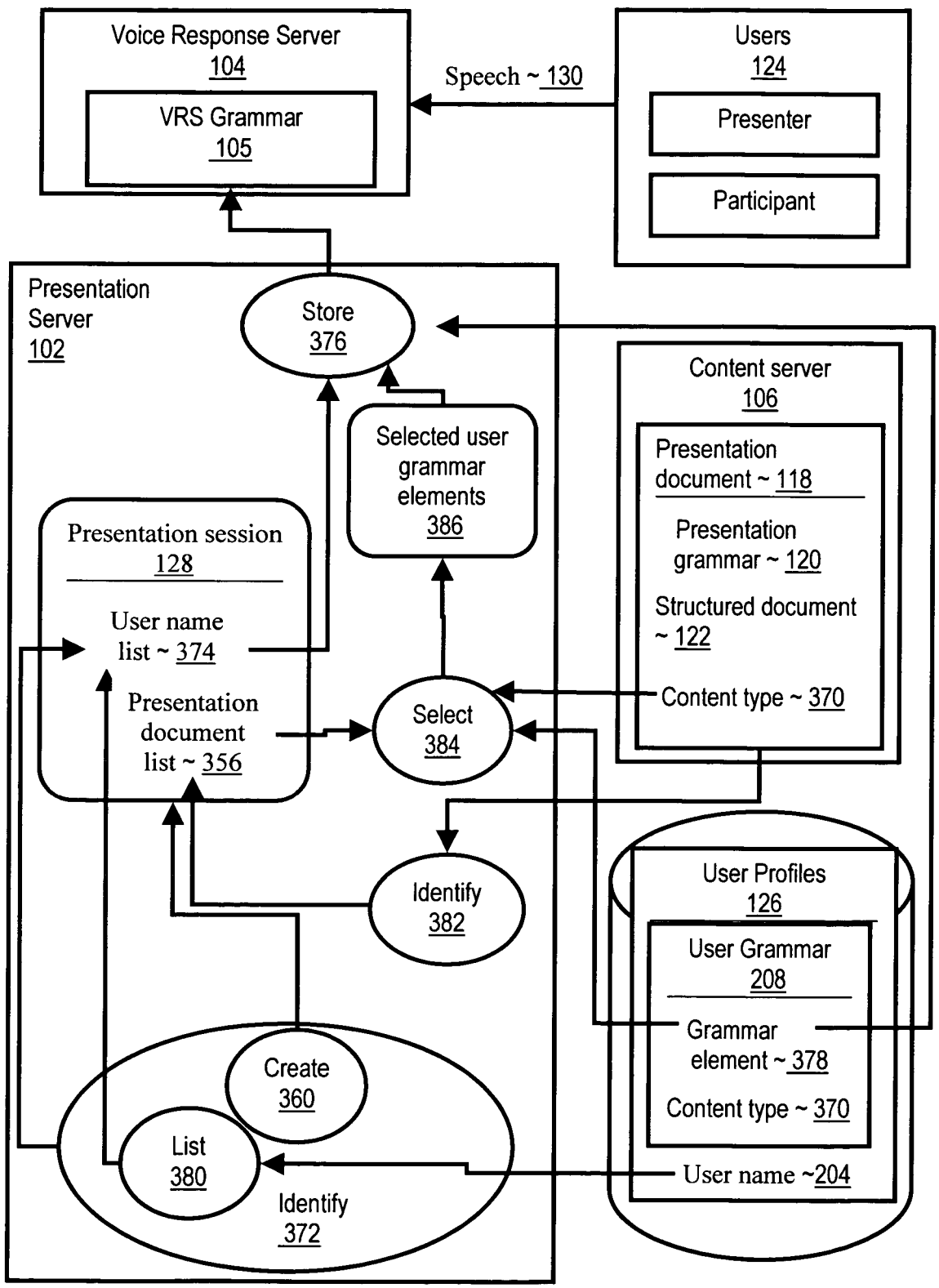
FIG. 13 sets forth a data flow diagram illustrating an exemplary method for creating a voice response grammar in a voice response server.

FIG. 13 sets forth a data flow diagram illustrating a method for creating a voice response grammar in a voice response server including identifying (372) a user (374) for a presentation where the user has a user grammar (208) and the user grammar includes one or more user grammar elements (378). The method of FIG. 13 also includes storing (376) a multiplicity of user grammar elements (378) for the user in a voice response grammar (105) on a voice response server (104). A user grammar is a data structure that includes a set of key phrases specific to a user that are used to formulate presentation control instructions for invoking presentation actions on presentation servers. For a presentation control instruction that invokes a presentation action instructing a presentation session to 'page down,' for example, an individual user may chose to associate with that presentation control instruction the key phrase "rock and roll" or "boogie on down" or any other key phrase favored by a user as will occur to those of skill in the art. Although these particular example are somewhat fanciful, in fact, user grammars serve a useful purpose by providing key phrases for presentation actions that distinguish normal speech. User grammars and voice response grammars may be structured like the full grammars illustrated in FIG. 5 with grammar elements (502-514) for a content type (410).

In the method of FIG. 13, identifying (372) a user for a presentation includes creating (360) a data structure (128) representing a presentation and listing (380) in the data structure (128, 374) at least one user identification (204). A data structure representing a presentation may be implemented as an instance of a presentation session class as shown at reference (128) on FIG. 2. In the method of FIG. 13, listing (380) in the data structure (128, 374) at least one user identification (204) includes creating a list of user names of the users that are registered with the presentation session. That is, a list of users currently participating in the presentation.

In the example of FIG. 13, the user grammar (208) includes a multiplicity of user grammar elements (378) for a content type (370). In this example, each grammar element includes an identifier of a structural element, a key phrase for invoking a presentation action, and an action identifier representing the presentation action, as shown for example in the depiction of an exemplary full grammar at references (318), (518), and (516) on FIG. 5.

The method of FIG. 13 includes identifying (382) presentation documents (118) for the presentation. In this example, each presentation document (118) having a content type (370), and selecting (384) user grammar elements (386) according to the content type (370) of the identified presentation documents (356). In the example of FIG. 13, selecting (384) user grammar elements (386) according to the content type (370) of the identified presentation documents (356) includes comparing the elements of the user grammar with each presentation document in the presentation session and extracting each element of the grammar having the same content type as a presentation document in the presentation session. In the method of FIG. 13, storing (376) a multiplicity of user grammar elements for the user in a voice response grammar on a voice response server is carried out by storing the selected user grammar elements (386) in the voice response grammar (105).

Figure 14:
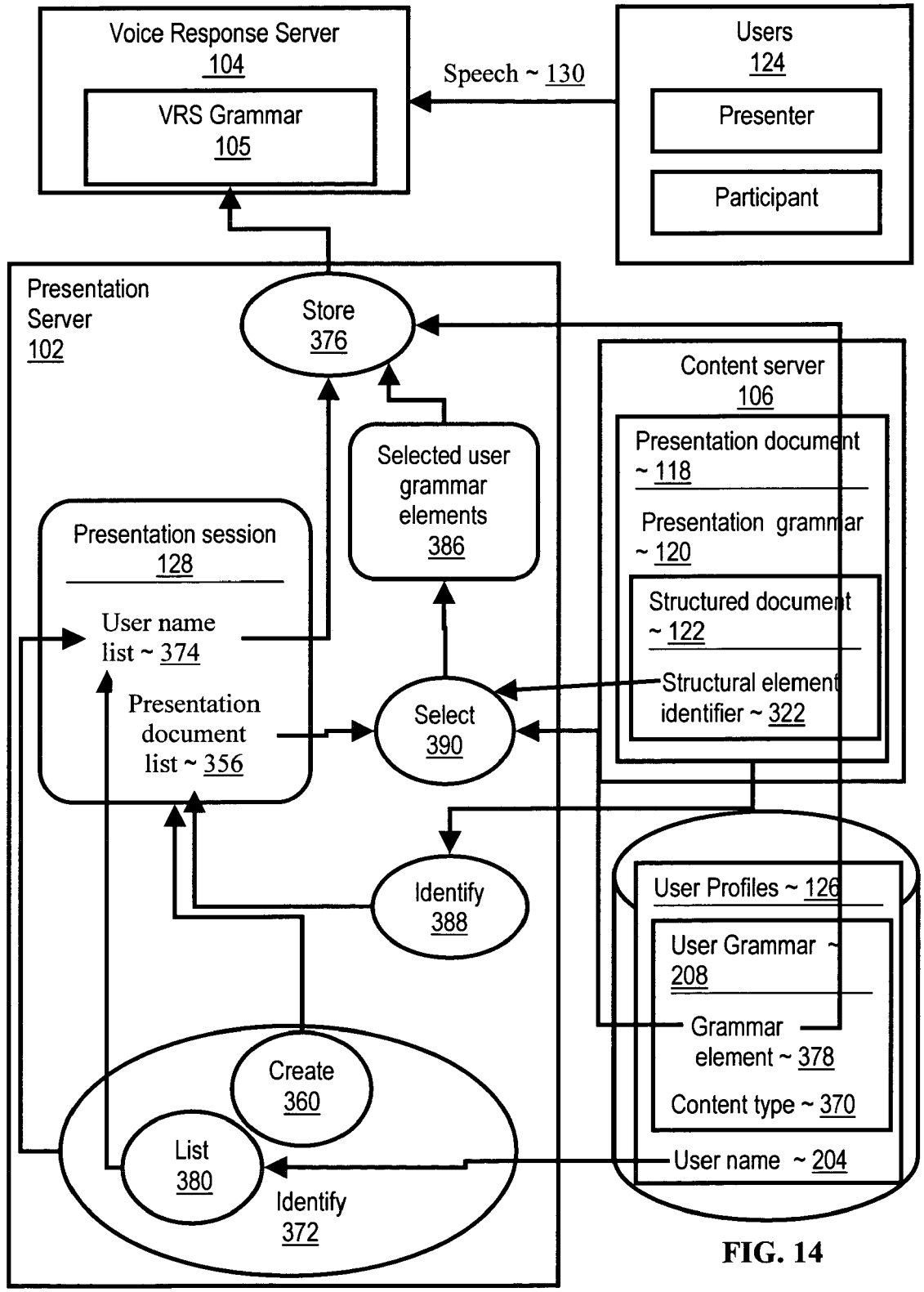
FIG. 14 is a data flow diagram illustrating an alternative exemplary method for creating a voice response grammar in a voice response server.

FIG. 14 is a data flow diagram illustrating an alternative exemplary method for creating a voice response grammar in a voice response server. The method of FIG. 14 includes identifying (388) presentation documents (118) for the presentation. The presentation documents (118) in this example include structured documents (122) having structural element identifiers (322). In the example of FIG. 14, the identified presentation documents are included in a presentation document list (356) in the presentation session.

The user grammar (208) in this example includes a multiplicity of user grammar elements (378), and the method includes selecting (390) user grammar elements (378) in dependence upon the structural element identifiers (322). In this example, selecting (390) user grammar elements (378) in dependence upon the structural element identifiers (322) is carried out by comparing the elements of the user grammar with each structured document of each presentation document in the presentation session and extracting each user grammar element having a structural element identifier for a structural element that occurs in a structured document of a presentation document in the presentation session. In the method of FIG. 14, storing (376) a multiplicity of user grammar elements for the user in a voice response grammar on a voice response server includes storing the selected user grammar elements (386) in the voice response grammar (105).

Figure 15:
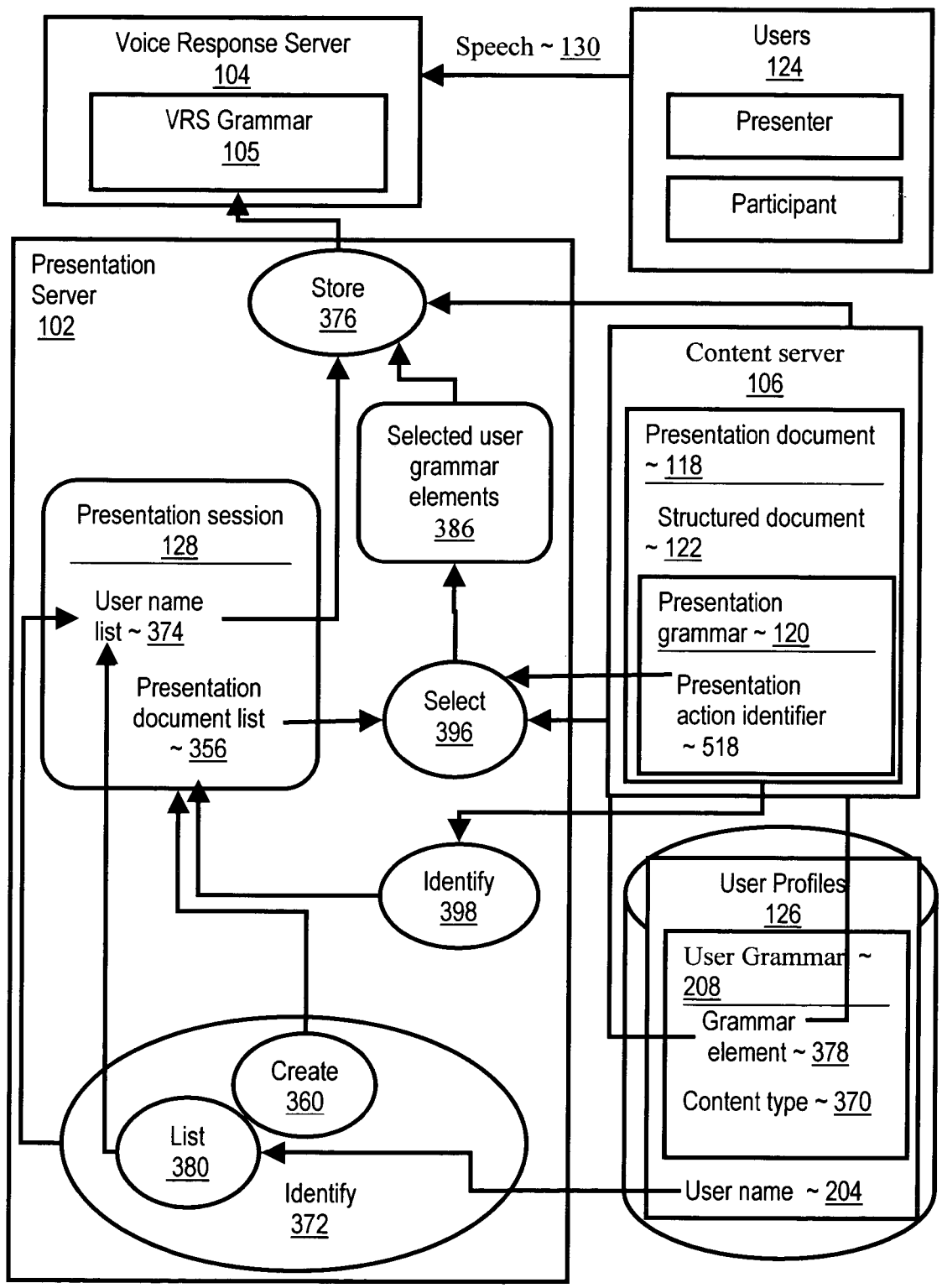
FIG. 15 is a data flow diagram illustrating another alternative exemplary method for creating a voice response grammar in a voice response server.

FIG. 15 is a data flow diagram illustrating another alternative exemplary method for creating a voice response grammar in a voice response server. The method of FIG. 15 includes identifying (394) presentation documents (118) for the presentation. Each presentation document (118) has a presentation grammar (120) including presentation action identifiers (518).

In the example of FIG. 15, the user grammar (208) includes a multiplicity of user grammar elements (378), and the method includes selecting (396) user grammar elements (378) in dependence upon the presentation action identifiers (518). In this example, selecting (396) user grammar elements (378) in dependence upon the presentation action identifiers (518) is carried out by comparing the elements of the user grammar with each presentation grammar of each presentation document of the presentation session and extracting from the user grammar each element having a presentation action identifier that occurs in a presentation grammar of the presentation document. In the method of FIG. 15, storing (376) a multiplicity of user grammar elements for the user in a voice response grammar on a voice response server includes storing the selected user grammar elements (386) in the voice response grammar (105).

Creating a Session Document from a Presentation Document

Figure 16:
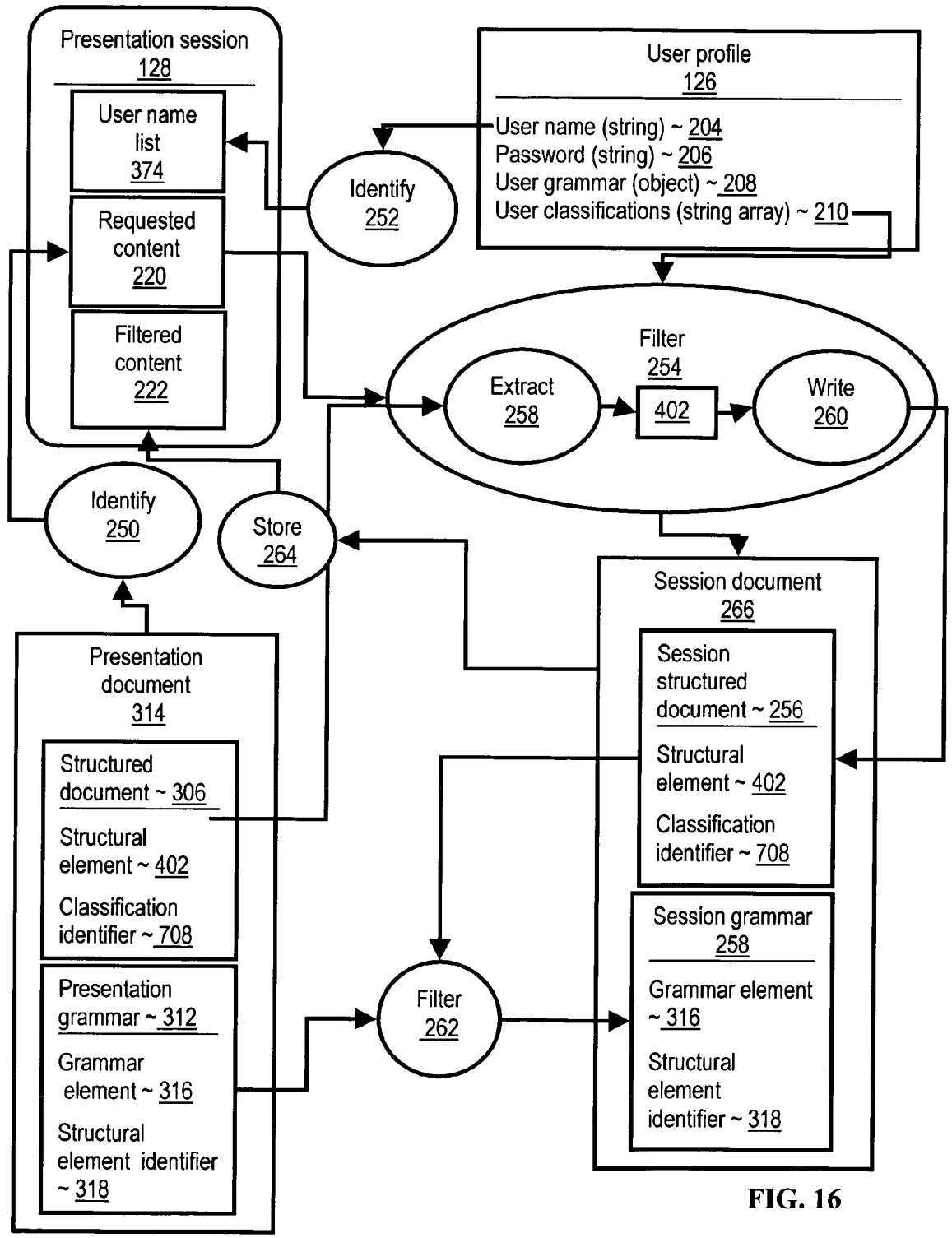
FIG. 16 sets forth a data flow diagram illustrating an exemplary method for creating a session document from a presentation document.

FIG. 16 sets forth a data flow diagram illustrating an exemplary method for creating a session document (266) from a presentation document (314). A session document is a repository for filtered content, presentation content that is filtered according to attributes of an audience for a presentation, an audience that presents a range of affiliations, technical abilities, security authorizations, and other attributes as will occur to those of skill in the art. The purpose of a session document is to provide a repository for reducing the volume of data for a presentation with respect to unfiltered presentation documents. A session document is a document derived from a presentation document targeted for the participants of a presentation. More particularly, a session document is a data structure that includes a session grammar derived from a presentation grammar in a presentation document and a session structured document derived from a structured document in a presentation document.

The method of FIG. 16 includes identifying (250) a presentation document (314) for a presentation. The presentation document (314) includes a presentation grammar (312) and a structured document (306) having structural elements (402) classified with classification identifiers (708). Identifying (250) a presentation document (314) typically includes inserting in a list (220) a location for the presentation document (314). The location of a presentation document may be represented by a URI, and a list of locations identifying presentation documents may be implemented as an array of URIs as exemplified by the requested content list (220) in the exemplary presentation session class (128) on FIG. 2.

The method of FIG. 16 includes identifying (252) a user participant (204) for the presentation. In the method of FIG. 16, the user has a user profile (126) that includes user classifications (210) each of which describes some attribute of a user, such as, for example, company affiliation, department membership, technical ability, security authorization level, and so on, for any attribute of a user as may occur to those of skill in the art. Identifying (252) a user (204) typically includes inserting in a list (374) a user identification (204) identifying a user in a presentation participant list (374). In the example of FIG. 16, a user identification is implemented as a user name (204) in a user profile (126).

The method of FIG. 16 includes filtering (254) the structured document (306) in dependence upon the user classifications (210) and the classification identifiers (708). In the method of FIG. 16, filtering (254) the structured document (306) is carried out by extracting (259), from the structured document (306), structural elements (402) having classification identifiers (708) corresponding to the user classifications (210), and writing (260) the extracted structural elements (402) into a session structured document (256) in the session document (266). The method of FIG. 16 also includes filtering (262) the presentation grammar (312), in dependence upon the extracted structural elements (402), into a session grammar (258) in the session document (266). The method of FIG. 16 includes storing (264) the location of the session document (266) in a session document list (222).

For further explanation, consider an example of creating a session document that begins with a presentation document having the following contents:

```
<presentationDocument>
    <presentationGrammar>
        <grammarElement>
            <contentType id="WP">
            <keyPhrase>page down</keyPhrase>
            <presentationAction id="PgDn">
            <structuralElementIdentifier id="page">
        </grammarElement >
        <grammarElement>
            <contentType id="WP">
            <keyPhrase>next bullet</keyPhrase>
            <presentationAction id="NextBullet">
            <structuralElementIdentifier id="bullet">
        </grammarElement >
    </presentationGrammar>
    <structuredDocument>

<p id="1">a paragraph on some subject</p>

<p id="2">a paragraph on a particular subject</p>
            <tech level="2">
            <p id="2">a more technical paragraph, same
                subject</p>
            </tech>
            <security level="2">
            <p id="2">a more secret paragraph, same subject</p>
            </security>
            <dept id="marketing">
            <p id="2">a paragraph, same subject, with added
                detail regarding marketing
                <bullet id ="1">some bullet text</bullet>
                <bullet id ="1">some other bullet text</bullet>
                <bullet id ="1">still more bullet text</bullet>
            </p>
            </dept>
            <company id="IBM">
            <p id="2">a paragraph, same subject with added detail
                pertinent to a user's company</p>
            </company>
            <p id="3">a paragraph on some other subject</p>
            ... ... ...

</structuredDocument>
</presentationDocument>
```

In this example, an audience of users identified for a presentation include users having in their user profiles user classifications indicating technical level '2' and membership in IBM. None of the registered users have security authorizations and none of them are from the marketing department. Filtering this exemplary presentation document, extracting structural elements with classification identifiers corresponding to the user classifications, writing those structural elements to a session document, and filtering the presentation grammar in dependence upon the extracted structural elements, results in the following exemplary session document:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
            <p id="2">a more technical paragraph, same subject</p>
            </tech>
            <company id="IBM">
            <p id="2">a paragraph, same subject with added detail
                pertinent to a user's company</p>
            </company>
            <p id="3">a paragraph on some other subject</p>
            ... ... ...

</sessionStructuredDocument>
</sessionDocument>
```

In the resulting session document, the structural element identified as page 2 now excludes versions for security level 2 and for marketing, because none of the users listed for the presentation are in the marketing department or have security authorizations of level 2. In addition, the session grammar excludes a grammar element for bullets because, in the session document above, the only structural element having bullets was the version of paragraph 2 for the marketing department. Excluding the bullets as structural elements in the session structured document means that there is no need to have grammar elements for them in the session grammar. Reducing the number of grammar elements in the session grammar reduces the number of grammar elements in the voice response grammar, thereby increasing the efficiency and accuracy of the voice response server and the overall presentation system.

Amending a Session Document During a Presentation

Figure 17:
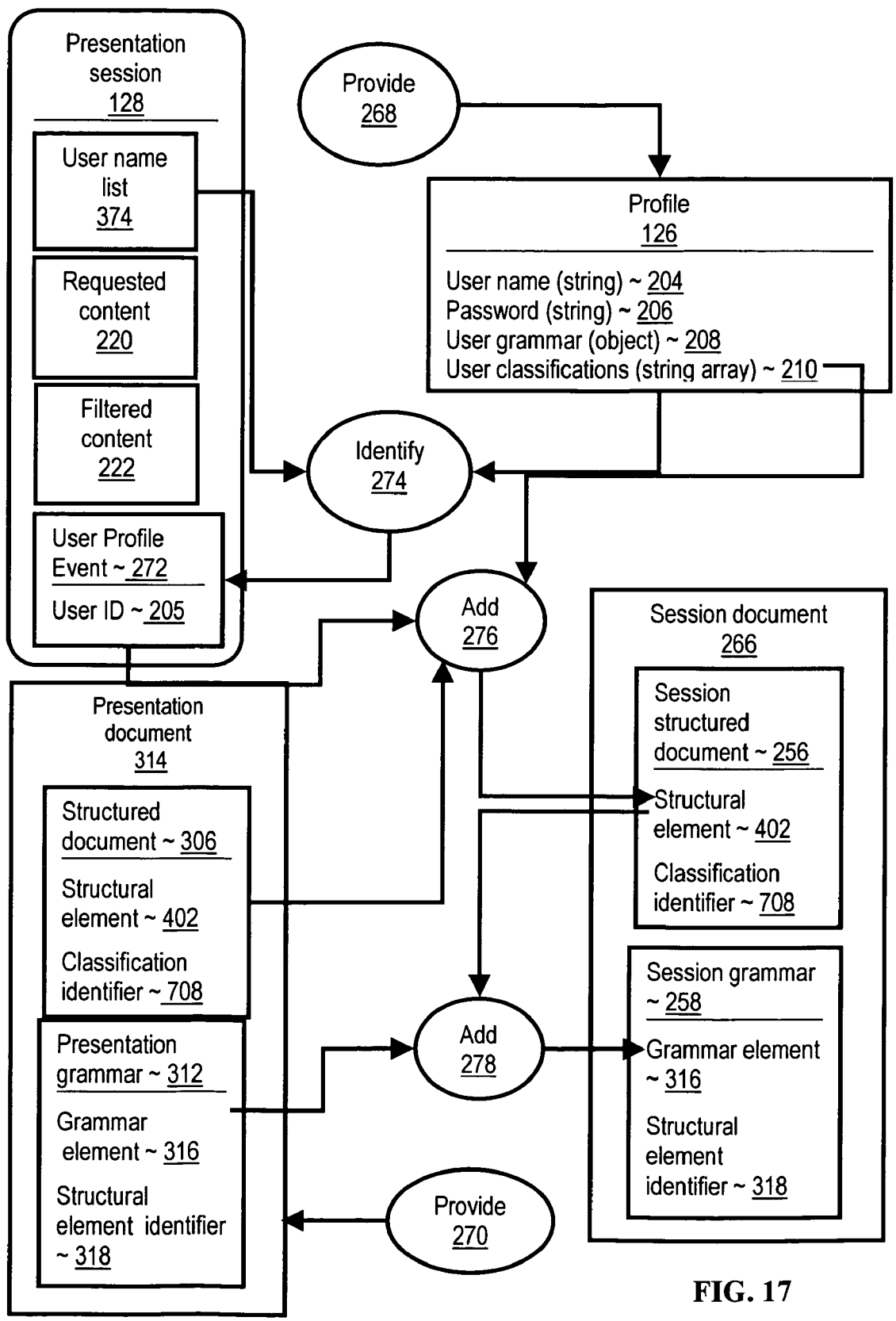
FIG. 17 sets forth a data flow diagram illustrating an exemplary method for amending a session document during a presentation.

FIG. 17 sets forth a data flow diagram illustrating an exemplary method for amending a session document (266) during a presentation. The session document (266) includes a session structured document (256), and the method of FIG. 17 includes providing (268) user profiles (126) representing users capable of participating in presentations. In typical embodiments, user profiles for all the users capable of participating in presentations are stored in a database accessible to the presentation session. In the example of FIG. 17, each user profile (126) includes user classifications (210) for a user.

The method of FIG. 17 also includes providing (270) a presentation document (314) that includes a structured document (306) having structural elements (402) classified with classification identifiers (708). In the example of FIG. 17, the locations of the presentation documents from which the session documents for a particular presentation were created are stored in a list such as the requested content list (220) of FIG. 17.

The method of FIG. 17 includes identifying (274) a user profile event (272) for a user during the presentation. A user profile event is an event that results in adding a user classification to the set of user classifications for a presentation. The set of user classifications for a presentation is the set of all user classifications for all users that have been identified as users for a presentation. A user profile event may be represented as a data structure (272) that includes a user identification (205) for a particular user.

A user profile event (272) may be generated by adding a user to the presentation, where the added user has a new user classification for the presentation. That is, one example of a user profile event (272) is adding to a presentation a user whose user classifications include at least one user classification having no corresponding classification identifier in any structural element in the session structured document.

In such an example, at least one of the added user's user classifications is currently not part of any user profile of any of the other users identified for the presentation.

A user profile event (272) also may be generated, for a further example, by changing a user classification (210) in a user profile (126) of a user who is participating in the presentation, where the changed user classification includes a new user classification for the presentation. That is, one example of a user profile event (272) is editing a user's profile during a presentation so that the user's user profile now includes a user classification having no corresponding classification identifier in any structural element in the session structured document. In such an example, the new user classification is currently not part of any user profile of any of the other users identified for the presentation.

The method of FIG. 17 includes adding (276) to the session structured document (256) at least one structural element (402) from the presentation document (314), the added structural element (402) having a classification identifier (708) that corresponds to a user classification (210) of the user. In the examples just mentioned, regarding adding a new user to a presentation or a new user classification to a profile, adding (276) to the session structured document (256) a structural element (402) from the presentation document (314), the added structural element (402) having a classification identifier (708) that corresponds to a user classification (210) of the user, means that the new structural element is one that no other user identified for the presentation was entitled to view. Because adding a structural element may mean adding a structural element of a kind not otherwise represented in the session structured document, the method of FIG. 17 advantageously also includes adding (278) a grammar element (316) to the session grammar (258) in dependence upon the added structural element (402).

For further explanation, consider the following example of amending a session document (266) during a presentation. In this example, a session document is used for a presentation having users whose user profiles include user classifications of technical level '2' and membership in IBM:

```
<sessionDocument>
  <sessionGrammar>
    <grammarElement>
      <contentType id="WP">
      <keyPhrase>page down</keyPhrase>
      <presentationAction id="PgDn">
      <structuralElementIdentifier id="page">
    </grammarElement >
  </sessionGrammar>
  <sessionStructuredDocument>

<p id="1"> a paragraph </p>
      <p id="2"> another paragraph </p>

<p id="2">a paragraph on a particular subject</p>
      <tech level="2">
      <p id="2">a more technical paragraph, same subject</p>
      </tech>
      <company id="IBM">
      <p id="2">a paragraph, same subject with added detail
         pertinent to a user's company</p>
      </company>
      <p id="3">a paragraph on some other subject</p>
      ... ... ...

</sessionStructuredDocument>
</sessionDocument>
```

This session document in this example was created from the following presentation document:

```
<presentationDocument>
  <presentationGrammar>
    <grammarElement>
      <contentType id="WP">
      <keyPhrase>page down</keyPhrase>
      <presentationAction id="PgDn">
      <structuralElementIdentifier id="page">
    </grammarElement >
    <grammarElement>
      <contentType id="WP">
      <keyPhrase>next bullet</keyPhrase>
      <presentationAction id="NextBullet">
      <structuralElementIdentifier id="bullet">
    </grammarElement >
  </presentationGrammar>
  <structuredDocument>

<p id="1">a paragraph on some subject</p>

<p id="2">a paragraph on a particular subject</p>
      <tech level="2">
      <p id="2">a more technical paragraph, same
      subject</p>
      </tech>
      <security level="2">
      <p id="2">a more secret paragraph, same subject</p>
      </security>
      <dept id="marketing">
      <p id="2">a paragraph, same subject, with added
         detail regarding marketing
         <bullet id ="1">some bullet text</bullet>
         <bullet id ="1">some other bullet text</bullet>
         <bullet id ="1">still more bullet text</bullet>
      </p>
      </dept>
      <company id="IBM">
      <p id="2">a paragraph, same subject with added detail
         pertinent to a user's company</p>
      </company>
      <p id="3">a paragraph on some other subject</p>
      ... ... ...

```

-continued

```
    </structuredDocument>
</presentationDocument>
```

The session document in this example contains no structural elements classified for users from the marketing department. After beginning the presentation a user from the marketing department joins the presentation. The user's joining the presentation is represented by adding the user's user identification to a list of users identified for the presentation. Adding the user ID to the list identifies (274) a user profile event (272) which is represented by a data structure that includes the user's user identification (205). Amending the session document proceeds by adding (276) to a session structured document (256) one or more structural elements (402) from a structured document in the presentation document from which the session structured document was created. Adding (276) to the session structured document (256) at least one structural element (402) from the presentation document (314) is carried out by adding a structural element (402) having a classification identifier (708) that corresponds to a user classification (210) of the user. User classifications of the user are read from the user profiles (126) using the user identification (205) provided to the adding process (276) by the user profile event (272). In this example, adding a structural element to the session structured documents is carried out by adding the following paragraph from the structured document of the presentation document set forth above:

```
<dept id="marketing">
    <p id="2">a paragraph, same subject, with added
    detail regarding marketing
        <bullet id ="1">some bullet text</bullet>
        <bullet id ="1">some other bullet text</bullet>
        <bullet id ="1">still more bullet text</bullet>
    </p>
</dept>,
``` thereby creating the following amended session document:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
            <p id="2">a more technical paragraph, same subject</p>
            </tech>
            <company id="IBM">
            <p id="2">a paragraph, same subject with added detail
                pertinent to a user's company</p>
            </company>
            <dept id="marketing">
            <p id="2">a paragraph, same subject, with added detail
                regarding marketing
                <bullet id ="1">some bullet text</bullet>
                <bullet id ="1">some other bullet text</bullet>
                <bullet id ="1">still more bullet text</bullet>
            </p>
            </dept>
            <p id="3">a paragraph on some other subject</p>
            ... ... ...

</sessionStructuredDocument>
</sessionDocument>
```

Amending the session document also includes adding to the session grammar of the session document a new grammar element from the presentation grammar. There were no bullets in the session structured document before the exemplary user profile event and therefore no grammar elements supporting presentation control instructions for bullets. Adding the marketing paragraph also added bullets, so the method advantageously includes adding grammar elements supporting presentation control instructions for bullets:

```
<grammarElement>
    <contentType id="WP">
    <keyPhrase>next bullet</keyPhrase>
    <presentationAction id="NextBullet">
    <structuralElementIdentifier id="bullet">
</grammarElement >,
``` thereby creating the following amended session document:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
        <grammarElement>
            <contentType id="WP">
            <keyPhrase>next bullet</keyPhrase>
            <presentationAction id="NextBullet">
            <structuralElementIdentifier id="bullet">
        </grammarElement >
    </sessionGrammar>
    <sessionStructuredDocument>

<p id="1"> a paragraph </p>
            <p id="2"> another paragraph </p>

<p id="2">a paragraph on a particular subject</p>
            <tech level="2">
            <p id="2">a more technical paragraph, same subject</p>
            </tech>
            <company id="IBM">
            <p id="2">a paragraph, same subject with added detail
                pertinent to a user's company</p>
            </company>
            <dept id="marketing">
            <p id="2">a paragraph, same subject, with added detail
                regarding marketing
                <bullet id ="1">some bullet text</bullet>
                <bullet id ="1">some other bullet text</bullet>
                <bullet id ="1">still more bullet text</bullet>
            </p>
            </dept>
            <p id="3">a paragraph on some other subject</p>
            ... ... ...
```

-continued

```

</sessionStructuredDocument>
</sessionDocument>
```

Differential Dynamic Content Delivery

Figure 18:
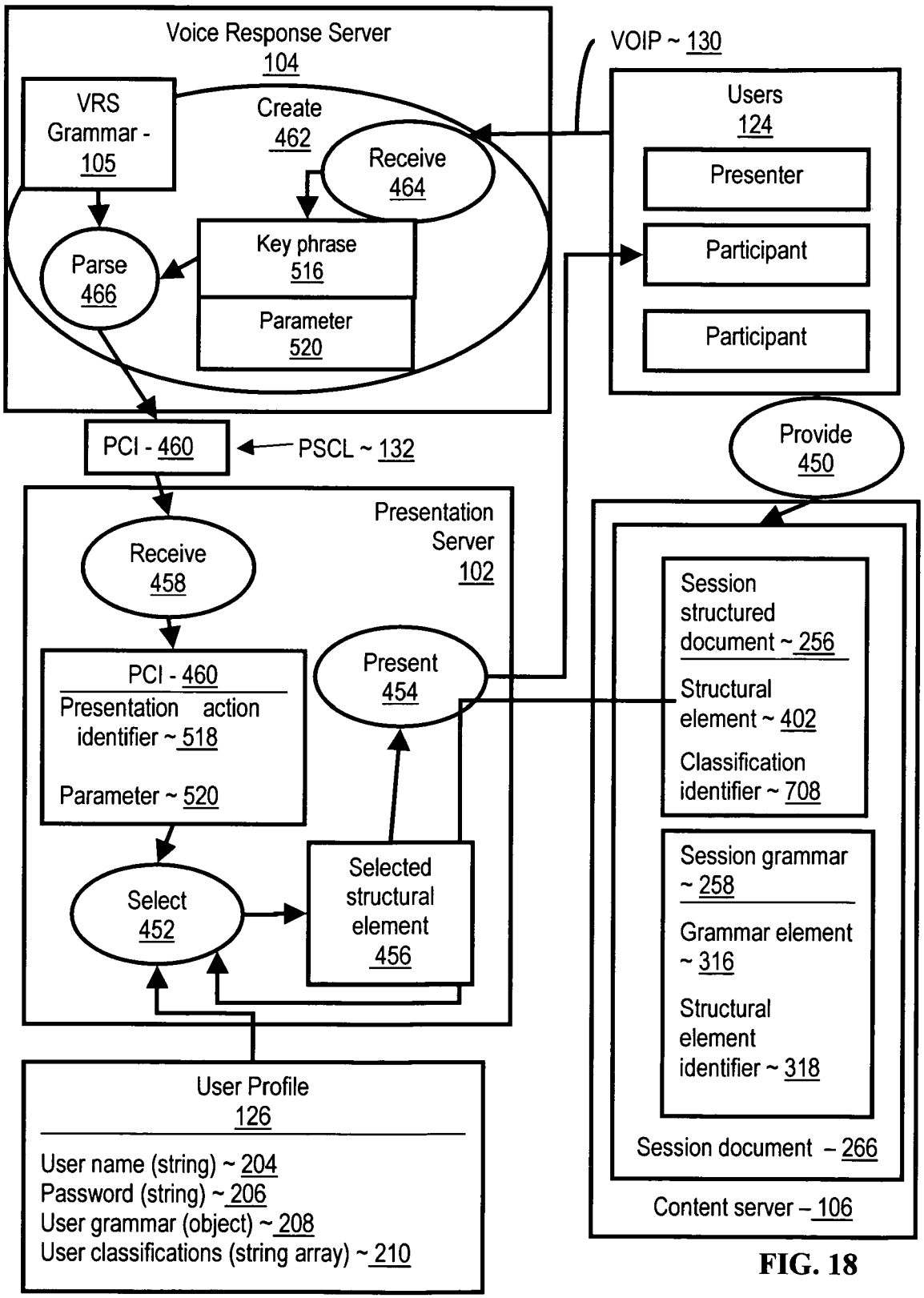
FIG. 18 sets forth a data flow diagram illustrating an exemplary method for differential dynamic content delivery.

FIG. 18 sets forth a data flow diagram illustrating an exemplary method for differential dynamic content delivery. Differential dynamic content delivery is delivery of the content of a presentation to user participants according to a wide variety of participant interest, company, group, or department membership, technical knowledge, security authorization, and so on, across almost any dimension in which participants may vary. Differential dynamic content delivery is accomplished generally in methods and systems according to embodiments of the present invention by use of structured, classified documents, presentation documents and session documents, each of which includes a grammar and a structured document as described below. Using such documents as a source of presentation content, differential dynamic content delivery is accomplished then by selecting from a structured document classified structural elements for delivery to particular user participants according to the classification identifiers in the document and user classifications from user profiles.

FIG. 18 sets forth a data flow diagram illustrating an exemplary method for differential dynamic content delivery that includes providing (450) a session document (266) for a presentation. In the method of FIG. 18, the session document (266) includes a session grammar (258) and a session structured document (256), and providing (450) a session document (266) for a presentation is carried out by creating a session document from a presentation document as described in detail above in the discussion regarding FIG. 16.

The method of FIG. 18 also includes creating (462) a presentation control instruction (460). A presentation control instruction is an instruction to a presentation server (102) to carry out a particular presentation action such as, for example, 'display next page,' 'display next slide,' 'display paragraph 5,' and so on. More particularly, in differential dynamic content delivery, presentation actions are carried out by presenting to a particular user a version of a particular structural element, such as a paragraph or a slide, according to user classifications such as company name, department name, security authorization, and so on. In the method of FIG. 18, an exemplary presentation control instruction (460) includes a presentation action identifier (518) and one or more optional parameters (520).

In the method of FIG. 18, creating the presentation control instruction is carried out by receiving (464) from a user (124) participating in the presentation a key phrase (516) and optional parameters (520) for invoking a presentation action and parsing (466) the key phrase (516) and parameters (520) against a voice response grammar (105) into a presentation control instruction (460). In this example, receiving (464) a key phrase (516) is carried out by use of a Voice Over Internet Protocol ("VoIP") link (130) that carries the speech of at least one user (124) from the user's client device to a voice response server (104). A VoIP link is a kind of computer hardware and software that uses an internet protocol network instead of a traditional telephone network as the transmission medium for speech. VoIP is sometimes referred to as 'IP telephony' or 'Voice Over the Internet' ("VOI"). Examples of user client devices include any computer equipment capable of converting input speech to digital data and transmitting it over the internet protocol to a voice response server, including handheld wireless devices, personal digital assistants, personal computers, laptop computers, and the like.

The method of FIG. 18 also includes receiving (458) a presentation control instruction (460) in a presentation server and selecting (452) from a session structured document (256) a classified structural element (402) in dependence upon user classifications (210) of a user participant (124) in the presentation. In the method of FIG. 18, selecting (452) a classified structural element (402) is carried out by selecting a classified structural element (402) in dependence upon the presentation action identifier (518) and the parameters (520) from the presentation control instruction (460). In the method of FIG. 18, selecting (452) a classified structural element (402) also includes selecting a classified structural element having an associated classification identifier (708) that corresponds to the user classification (210).

For further explanation, consider an example using the following exemplary session document:

```
<sessionDocument>
  <sessionGrammar>
    <grammarElement>
      <contentType id="WP">
      <keyPhrase>page down</keyPhrase>
      <presentationAction id="PgDn">
      <structuralElementIdentifier id="page">
    </grammarElement >
  </sessionGrammar>
  <sessionStructuredDocument>

<p id="1"> a paragraph </p>
      <p id="2"> another paragraph </p>

<p id="2">a paragraph on a particular subject</p>
      <tech level="2">
      <p id="2">a more technical paragraph, same
          subject</p>
      </tech>
      <company id="IBM">
      <p id="2">a paragraph, same subject with added detail
          pertinent to a user's company</p>
      </company>
      <p id="3">a paragraph on some other subject</p>
      ... ... ...

</sessionStructuredDocument>
</sessionDocument>
```

In this example, assume that a first user participant has in a user profile user classifications indicating that the user is an IBM employee and a second user has user classifications indicating that the user has technical ability level '2'. In this example, a presentation server having the above session document installed upon it receives (458) a presentation control instruction (460) to move to the display to the second page of the session structured document. The presentation server then selects (452) from the session structured document (256) for the first user the structural element identified as a version of page two and classified as:

```
<company id="IBM">
<p id="2">a paragraph, same subject with added detail
    pertinent to a user's company</p>
</company>
``` and for the second user the structural element identified as a version of page two and classified as:

```
<tech level="2">
    <p id="2">a more technical paragraph, same subject</p>
</tech>
```

The method of FIG. 18 also includes presenting (454) the selected structural element (456) to the user (124). In the method of FIG. 18, presenting (454) the selected structural element (456) to the user may be carried out, for example, by selecting a data communications protocol for the presentation, inserting the selected structural element (without its classification identifiers) in a data structure appropriate to the data communications protocol, and transmitting the data structure to the user according to the data communications protocol. If, for example, the data communications protocol is selected as HTTP, a data structure appropriate to the data communications protocol is an HTML document in an HTTP RESPONSE message. In such an example, presenting (454) the selected structural element (456) to the user may be carried out, for the two exemplary versions of page two selected above, by the following HTTP RESPONSE messages:

```
HTTP/1.1 200 OK
Date: _____
Content-Type: text/xml
Content-Length: 128
   <html><body><p id="2"> a paragraph, same subject with
       added detail pertinent to a user's company</p></
       body></html>
``` and for the second user the structural element identified as a version of page two and classified as:

```
HTTP/1.1 200 OK
Date: _____
Content-Type: text/xml
Content-Length: 103
   <html><body><p id="2">a more technical paragraph,
       same subject</p></body></html>
``` respectively, the first sent to the client device of the first user and the second sent to the client device of the second user. Note that in both transmission, the classification identifiers are omitted, <company id="IBM"> and <tech level="2"> respectively.

This example of presenting (454) a selected structural element (456) to a user (124) is expressed in terms of HTML and HTTP, a stateless, asynchronous protocol. Many embodiments will statefully hold open a data communications connection, such as a TCP/IP connection, between a presentation server and a user client device. A Stateful Java Enterprise Session Bean™ may be used, for example, to hold open a TCP/IP connection implemented with a Java socket object. Readers of skill in the art will recognize therefore that HTML and HTTP are used for explanation, not for limitation. In fact, any presentation application using any appropriate data communications protocol useful for multi-media presentations may be used to present structural elements to users according to embodiments of the present invention. Such application may be obtained off-the-shelf commercially or they may be specially developed for particular presentations or kinds of presentation. An example of such an application available commercially is Microsoft NetMeeting™.

Examples of other data communications protocols useful with various embodiments of the present invention include the Session Initiation Protocol specified in the IETF's RFC 2543, the Real Time Streaming Protocol as specified in the IETF's RFC 2326, the Real Time Transport Protocol of RFC 1889, and the World Wide Web Consortium's VoiceXML protocol specified in the 2003 document entitled "Voice Extensible Markup Language (VoiceXML) Version 2.0".

Figure 19:
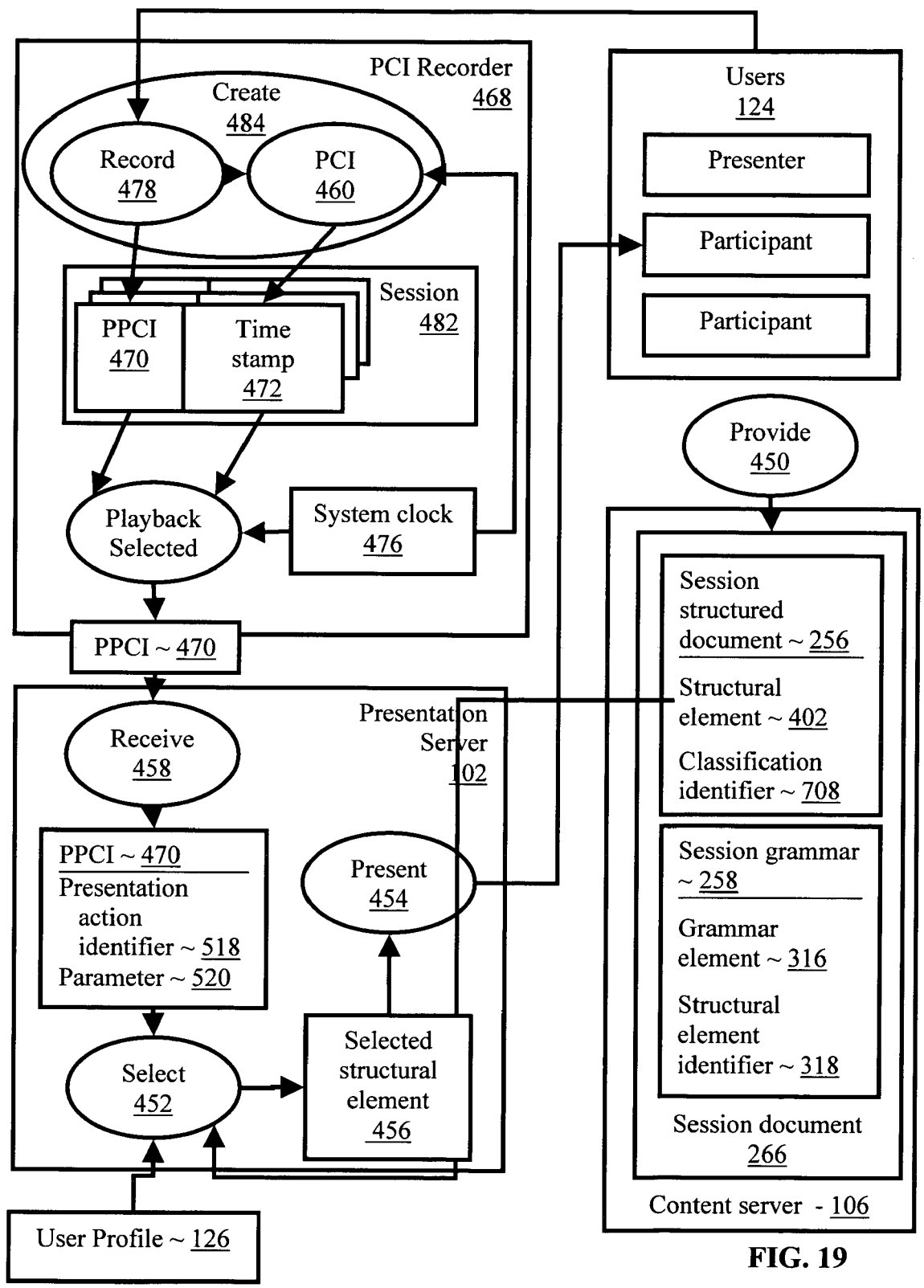
FIG. 19 sets forth a data flow diagram illustrating another exemplary method for differential dynamic content delivery with prerecorded presentation control instructions.

Differential Dynamic Content Delivery with
Prerecorded Presentation Control Instructions FIG. 19 sets forth a data flow diagram illustrating an exemplary method for differential dynamic content delivery with prerecorded presentation control instructions. FIG. 19 sets forth a data flow diagram illustrating an exemplary method for differential dynamic content delivery that includes providing (450) a session document (266) for a presentation. In the method of FIG. 19, the session document (266) includes a session grammar (258) and a session structured document (256), and providing (450) a session document (266) for a presentation is carried out by creating a session document from a presentation document as described in detail above in the discussion regarding FIG. 16.

The method of FIG. 19 includes creating (484) a prerecorded presentation session (482), including repeatedly recording (478) a presentation control instruction (460); and recording (480) a time stamp (472) in association with the presentation control instruction (460). The prerecorded presentation session of FIG. 19 is a collection of recorded presentation control instructions associated with a collection of time stamps. As discussed above, a presentation control instruction (460) is an instruction to a presentation server (102) to carry out a particular presentation action such as, for example, 'display next page,' 'display next slide,' 'display paragraph 5,' and so on. Recording presentation control instructions with time stamps advantageously allows playback of a prerecorded presentation session. In the method of FIG. 19, recording a presentation control instruction (460) results in a prerecorded presentation control instruction (470). That is, a recorded presentation control instruction (460) is a prerecorded presentation control instruction (470).

The method of FIG. 19 includes playback of a prerecorded presentation session. Playback of the prerecorded presentation session typically includes sending prerecorded presentation control instructions to a presentation server at time intervals dictated by time stamps associated with the prerecorded presentation control instructions. In the example of FIG. 19, the presentation control instruction recorder (468) uses a system clock (476) to time the playback of the prerecorded presentation session.

The method of FIG. 19 includes receiving (458) a prerecorded presentation control instruction (470) having an associated time stamp (472) and selecting (452) from the session structured document (256) a classified structural element (402) in dependence upon the prerecorded presentation control instruction (470) and in dependence upon user classifications of a user participant in the presentation. In the method of FIG. 19, selecting (452) a classified structural element (402) is carried out by selecting a classified structural element (402) in dependence upon the presentation action identifier (518) and the parameters (520) from prerecorded presentation control instruction (470). In the method of FIG. 19, selecting (452) a classified structural element (402) also includes selecting a classified structural element having an associated classification identifier (708) that corresponds to the user classification (210).

For further explanation, consider an example using the following exemplary session document:

```
<sessionDocument>
    <sessionGrammar>
        <grammarElement>
            <contentType id="WP">
            <keyPhrase>page down</keyPhrase>
            <presentationAction id="PgDn">
            <structuralElementIdentifier id="page">
        </grammarElement >
    </sessionGrammar>
    <sessionStructuredDocument>

<p id="1"> a paragraph </p>
            <p id="2"> another paragraph </p>

<p id="3">a paragraph on a particular subject</p>
            <tech level="2">
            <p id="3">a more technical paragraph, same
                subject</p>
            </tech>
            <company id="IBM">
            <p id="3">a paragraph, same subject with added detail
                pertinent to a user's company</p>
            </company>
            <p id="4">a paragraph on some other subject</p>
            ... ...

</sessionStructuredDocument>
</sessionDocument>
```

In this example, assume that a first user participant has in a user profile user classifications indicating that the user is an IBM employee and a second user has user classifications indicating that the user has technical ability level '2'. In this example, a presentation server receives prerecorded presentation control instructions (470) from playback of a presentation control instruction recorder (468). The presentation server (102) has the above session document installed upon it receives (458) a prerecorded presentation control instruction (470) to move to the display to the third paragraph of the session structured document. The presentation server then selects (452) from the session structured document (256) for the first user the structural element identified as a version of paragraph 3 and classified as:

```
<company id="IBM">
<p id="3">a paragraph, same subject with added detail
    pertinent to a user's company</p>
</company>
``` and for the second user the structural element identified as a version of page two and classified as:

```
<tech level="2">
<p id="3">a more technical paragraph, same subject</p>
</tech>
```

The method of FIG. 19 also includes presenting (454) the selected structural element (456) to the user (124). In the method of FIG. 19, presenting (454) the selected structural element (456) to the user may be carried out, for example, by selecting a data communications protocol for the presentation, inserting the selected structural element (without its classification identifiers) in a data structure appropriate to the data communications protocol, and transmitting the data structure to the user according to the data communications protocol. If, for example, the data communications protocol is selected as HTTP, a data structure appropriate to the data communications protocol is an HTML document in an HTTP RESPONSE message. In such an example, presenting (454) the selected structural element (456) to the user may be carried out, for the two exemplary versions of page two selected above, by the following HTTP RESPONSE messages:

HTTP/1.1 200 OK
Date: _____
Content-Type: text/xml
Content-Length: 128
<html><body><p id="3"> a paragraph, same subject with added detail pertinent to a user's company</p></body></html> and for the second user the structural element identified as a version of page two and classified as:
HTTP/1.1 200 OK
Date: _____
Content-Type: text/xml
Content-Length: 103
<html><body><p id="3"> a more technical paragraph, same subject</p></body></html> respectively, the first sent to the client device of the first user and the second sent to the client device of the second user. Note that in both transmission, the classification identifiers are omitted, <company id="IBM"> and <tech level="2"> respectively.

As noted, the method of FIG. 19 includes creating (484) a prerecorded presentation session (482) by recording (478) a presentation control instruction (460) as a prerecorded presentation control instruction (470) and recording (480) along with the prerecorded presentation control instruction a time stamp (472) indicating when during a presentation a particular prerecorded presentation control instruction is to be played back by, for example, sending (474) it along to a presentation server (102) for execution. One way for a user to record (478) a presentation control instruction is to simply type it into a table through a keyboard, a traditional kind of data entry in which a sequence of presentation control instruction become a kind of macro or software program for controlling playback of a presentation.

Figure 20:
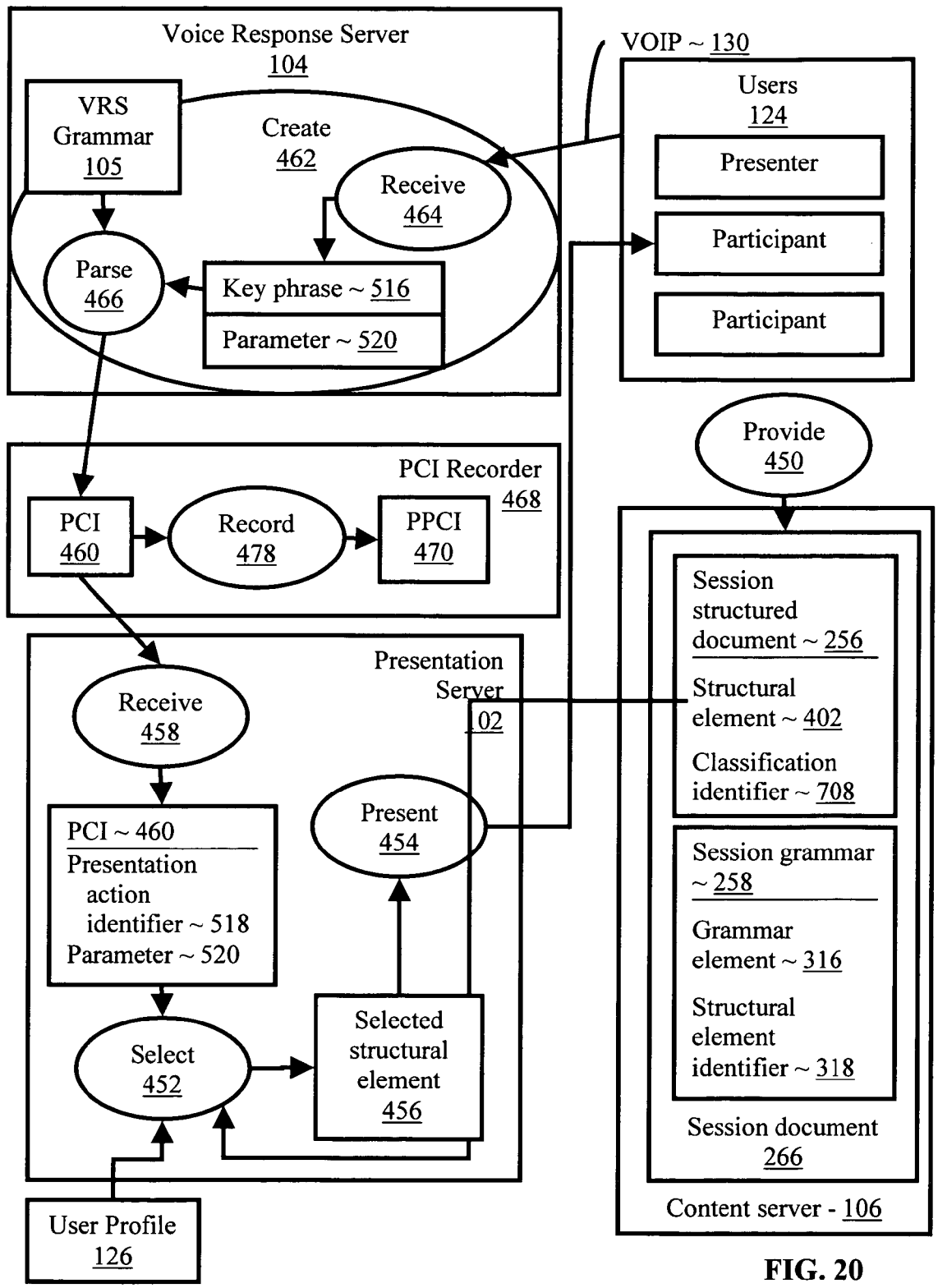
FIG. 20 sets forth a flow chart illustrating an exemplary method of recording presentation control instruction to create prerecorded presentation control instructions.

FIG. 20 illustrates an additional exemplary method of recording presentation control instruction (460) to create prerecorded presentation control instructions (470). The method of FIG. 20 records (478) presentation control instructions (460) as they are created (462) from key phrases (516) spoken remotely by a user (124) and communicated to a voice response server through a VIOP connection (130). The key phrases may be spoken as part of a live presentation in which the presentation control instructions are received (458), used to select (452) classified structural elements which are then presented (454) to the users participating in a live presentation. Or the presentation control instructions (460) may be recorded (478) off-line, as it were, without simultaneous live reception (458), selection (452), and presentation (454) of selected structural elements (446) to users.

More particularly, the method of FIG. 20 includes creating (462) a presentation control instruction (460). In the method of FIG. 20, an exemplary presentation control instruction (460) includes a presentation action identifier (518) and one or more optional parameters (520). In the method of FIG. 20, creating the presentation control instruction is carried out by receiving (464) from a user (124) participating in the presentation a key phrase (516) and optional parameters (520) for invoking a presentation action and parsing (466) the key phrase (516) and parameters (520) against a voice response grammar (105) into a presentation control instruction (460). In this example, receiving (464) a key phrase (516) is carried out by use of a Voice Over Internet Protocol ("VoIP") link (130) that carries the speech of at least one user (124) from the user's client device to a voice response server (104). Examples of user client devices include any computer equipment capable of converting input speech to digital data and transmitting it over the internet protocol to a voice response server, including handheld wireless devices, personal digital assistants, personal computers, laptop computers, and the like.

Differential Dynamic Delivery of Content to Users Not in Attendance at a Presentation Differential dynamic content delivery has been described in this specification as methods and systems in which session documents are constructed for one or more users who attend a presentation. Such session documents have been created on the assumption that all users listed as participants for a presentation will in fact attend the presentation—so that classified structural elements from a presentation document are always selected for all such users according to their user classifications. In such systems, classified structural elements for users who will not attend are not selected—so that a session document would be less useful in subsequent presentations or in playback of recorded presentation control instructions for a user not listed as an attendee at the time when the session document was created. It would be advantageous, however, to support the selection of classified structural elements for session documents according to user classifications regardless whether a particular user will attend any particular presentation.

Figure 21:
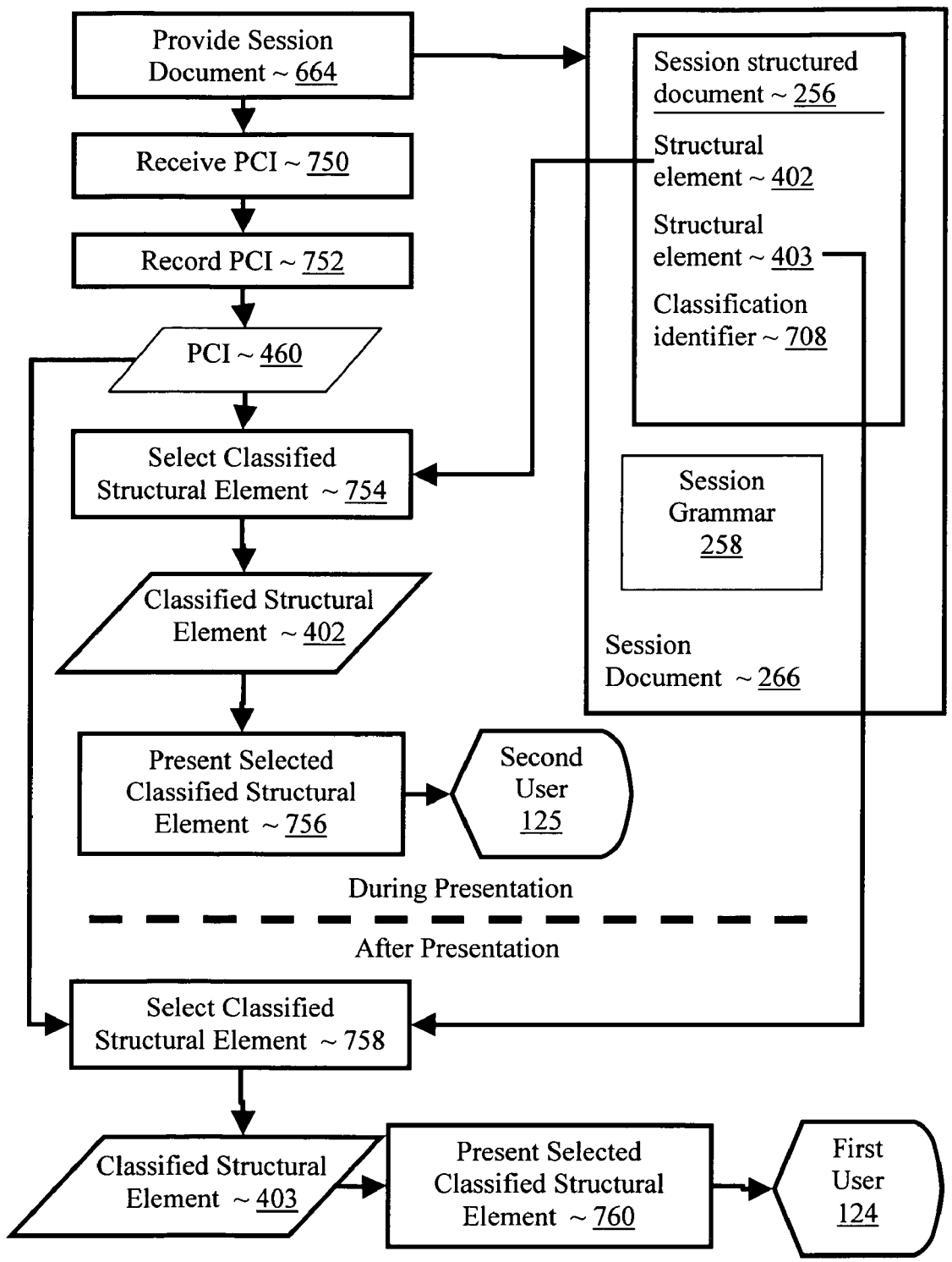
FIG. 21 sets forth flow chart illustrating an exemplary method for differential dynamic content delivery to users not in attendance at a presentation.

FIG. 21 sets forth flow chart illustrating an exemplary method for differential dynamic content delivery that operates generally by providing a session document for a presentation, where the session document includes a classified structural element for a first user who will not attend a presentation and a classified structural element for a second user who will attend the presentation, selecting during the presentation classified structural elements for the second user in dependence upon presentation control instructions and user classifications of the second user, presenting to the second user during the presentation the selected classified structural elements for the second user, selecting, after the presentation, classified structural elements for the first user in dependence upon the recorded presentation control instructions and the user classifications of the first user, and presenting after the presentation the classified structural elements selected for the first user. More particularly, the method of FIG. 21 includes providing (664) a session document (266) for a presentation including a session grammar (258) and a session structured document (256), the session structured document (256) including a classified structural element (403) for a first user (124) who will not attend a presentation and a classified structural element (402) for a second user (125) who will attend the presentation. In the method of FIG. 21, the session document (266) includes a session grammar (258) and a session structured document (256), and providing a session document (266) for a presentation is carried out by creating a session document from a presentation document as described in detail above in the discussion regarding FIG. 16.

The method of FIG. 21 also includes receiving (750) and recording (752), during the presentation, presentation control instructions (460) controlling the presentation. As discussed above, a presentation control instruction is an instruction to a presentation server to carry out a particular presentation action such as, for example, 'display next page,' 'display next slide,' 'display paragraph 5,' and so on. More particularly, in differential dynamic content delivery, presentation actions are carried out by presenting to a particular user a version of a particular structural element, such as a paragraph or a slide, according to user classifications such as company name, department name, security authorization, and so on. In the method of FIG. 21, an exemplary presentation control instruction (460) includes a presentation action identifier and one or more optional parameters. As discussed above with reference to FIG. 18, a presentation control instruction is typically created by receiving from a user participating in the presentation a key phrase and optional parameters for invoking a presentation action and parsing the key phrase and parameters against a voice response grammar into a presentation control instruction.

In the method of FIG. 21, recording (752), during the presentation, presentation control instructions (460) controlling the presentation is carried out by repeatedly recording a presentation control instruction (460) and recording a time stamp in association with the presentation control instruction (460). The resultant recorded presentation session of FIG. 21 is therefore a collection of recorded presentation control instructions associated with a collection of time stamps. Recording presentation control instructions with time stamps advantageously allows playback of a prerecorded presentation session.

The method of FIG. 21 also includes selecting (754) during the presentation classified structural elements (402) for the second user (125) in dependence upon the presentation control instructions (460) and user classifications of the second user. In the method of FIG. 21, selecting (754) during the presentation classified structural elements (402) for the second user (125) in dependence upon the presentation control instructions (460) and user classifications of the second user is carried out by selecting a classified structural element in dependence upon the presentation action identifier and the parameters from the presentation control instruction. In the method of FIG. 21, selecting (754) during the presentation classified structural elements (402) for the second user (125) in dependence upon the presentation control instructions (460) and user classifications of the second user also includes selecting a classified structural element having an associated classification identifier that corresponds to the user classification.

The method of FIG. 21 also includes presenting (756) to the second user (125) during the presentation the selected classified structural elements (402) for the second user. As discussed in more detail above with reference to FIG. 18, presenting (454) the selected structural element (456) to the user may be carried out, for example, by selecting a data communications protocol for the presentation, inserting the selected structural element (without its classification identifiers) in a data structure appropriate to the data communications protocol, and transmitting the data structure to the user according to the data communications protocol.

In the method of FIG. 21, after the presentation ends, the recorded presentation control instructions are used to playback the presentation for the first user. Playback of the recorded presentation session typically includes sending prerecorded presentation control instructions to a presentation server at time intervals dictated by time stamps associated with the prerecorded presentation control instructions. In the example of FIG. 21, the presentation control instruction recorder uses a system clock to time the playback of the prerecorded presentation session.

The method of FIG. 21 also includes selecting (758), after the presentation, classified structural elements (403) for the first user (124) in dependence upon the recorded presentation control instructions (460) and the user classifications of the first user. The method of FIG. 21 includes receiving a prerecorded presentation control instruction having an associated time stamp and selecting from the session structured document a classified structural element in dependence upon the prerecorded presentation control instruction and in dependence upon user classifications of the first user. In the method of FIG. 21, selecting (758), after the presentation, classified structural elements (403) for the first user (124) in dependence upon the recorded presentation control instructions (460) and the user classifications of the first user is carried out by selecting a classified structural element in dependence upon the presentation action identifier and the parameters from the recorded presentation control instructions. In the method of FIG. 21, selecting (758), after the presentation, classified structural elements (403) for the first user (124) in dependence upon the recorded presentation control instructions (460) and the user classifications of the first user also includes selecting a classified structural element having an associated classification identifier that corresponds to the user classifications of the first user.

The method of FIG. 21 also includes presenting (760) after the presentation the classified structural elements selected (403) for the first user (124). As discussed above in more detail with reference to FIG. 18, presenting (454) the selected structural element (456) to the user may be carried out, for example, by selecting a data communications protocol for the presentation, inserting the selected structural element (without its classification identifiers) in a data structure appropriate to the data communications protocol, and transmitting the data structure to the user according to the data communications protocol.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for differential dynamic content delivery, the method comprising:
   creating a presentation document, including:
      creating, in dependence upon an original document, a structured document comprising one or mare structural elements;
      classifying a structural element of the structured document according to a presentation attribute; and
      creating a presentation grammar for the structured document, wherein the presentation grammar for the structured document includes grammar elements each of which includes an identifier for at least one structural element of the structured document;
   creating a session document from the presentation document, including:
      identifying a presentation document for a presentation, the presentation document including a presentation grammar and a structured document having structural elements classified with classification identifiers;
      identifying a user participant for the presentation, the user having a user profile comprising user classifications; and
      filtering the structured document in dependence upon the user classifications of a first user who will not attend a presentation, the user classifications of a second user who will attend the presentation, and the classification identifiers;
   providing a session document for a presentation including a session grammar and a session structured document, the session structured document including a classified structural element for the first user and a classified structural element for the second user who will attend the presentation;
   creating a presentation control instruction, including:
   receiving from a user participating in the presentation a key phrase and optional parameters for invoking a presentation action; and
   parsing the key phrase and parameters against a voice response grammar into a presentation control instruction;
      wherein:
         each presentation control instruction includes a presentation action identifier and optional parameters; and
   receiving, during the presentation, presentation control instructions controlling the presentation;
   recording, during the presentation, the presentation control instructions controlling the presentation, wherein each recorded presentation control instruction has an associated time stamp;
   selecting during the presentation classified structural elements for the second user in dependence upon the presentation control instructions and user classifications of the second user, wherein selecting during the presentation classified structural elements for the second user in dependence upon the presentation control instructions and user classifications of the second user further comprises selecting a classified structural element in dependence upon the presentation action identifier and the parameters;
   presenting to the second user during the presentation the selected classified structural elements for the second user;
   selecting, after the presentation, classified structural elements for the first user in dependence upon the presentation control instructions and the user classifications of the first user, wherein selecting, after the presentation, classified structural elements for the first user in dependence upon the recorded presentation control instructions and the user classifications of the first user further comprises selecting a classified structural element in dependence upon the presentation action identifier and the parameters; and
   presenting after the presentation the classified structural elements selected for the first user.

* * * * *